(12) United States Patent
Tsukui et al.

(10) Patent No.: US 10,396,342 B2
(45) Date of Patent: Aug. 27, 2019

(54) METHOD FOR MANUFACTURING SECONDARY CELL HAVING A WOUND BODY EFFECTIVELY IMPREGNATED WITH ELECTROLYTIC SOLUTION

(71) Applicant: TOYOTA JIDOSHA KABUSHIKI KAISHA, Toyota-shi, Aichi (JP)

(72) Inventors: Akira Tsukui, Toyota (JP); Hiroyasu Kado, Seto (JP); Nobuhiro Yamada, Toyota (JP); Akio Minakuchi, Okazaki (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 270 days.

(21) Appl. No.: 15/029,540

(22) PCT Filed: Oct. 3, 2014

(86) PCT No.: PCT/JP2014/076567
§ 371 (c)(1),
(2) Date: Apr. 14, 2016

(87) PCT Pub. No.: WO2015/056583
PCT Pub. Date: Apr. 23, 2015

(65) Prior Publication Data
US 2016/0254523 A1 Sep. 1, 2016

(30) Foreign Application Priority Data

Oct. 15, 2013 (JP) .................................. 2013-214628
Mar. 12, 2014 (JP) .................................. 2014-049161

(51) Int. Cl.
*H01M 2/36* (2006.01)
*H01M 10/0525* (2010.01)
(Continued)

(52) U.S. Cl.
CPC ......... *H01M 2/36* (2013.01); *H01M 10/0431* (2013.01); *H01M 10/0481* (2013.01);
(Continued)

(58) Field of Classification Search
CPC .... H01M 2/36; H01M 10/04; H01M 10/0431; H01M 10/0587; H01M 2/361
See application file for complete search history.

(56) References Cited

U.S. PATENT DOCUMENTS 4,483,909 A * 11/1984 Klein .................... H01M 2/361
429/94
4,529,020 A * 7/1985 Hoover ................ H01M 2/361
141/103

(Continued)

FOREIGN PATENT DOCUMENTS

JP     09-102443 A    4/1997
JP     2012-134047 A  7/2012
(Continued)

*Primary Examiner* — Imran Akram
(74) *Attorney, Agent, or Firm* — Sughrue Mion, PLLC

(57) ABSTRACT

Provided is a method for manufacturing a secondary cell by which a wound body can be effectively impregnated with an electrolytic solution. The method includes: a step of depressurizing an interior of an outer case 30; a step of pouring an electrolytic solution E into the depressurized outer case 30; a step of depressurizing the interior of the outer case 30; a step of pouring the electrolytic solution E into the depressurized outer case 30; a step of impregnating the wound body with the electrolytic solution E from both axial end portions 100*a*, 100*b* of a wound body 100; a step of waiting until a difference in pressure between a wound body external space S, which is a space between the outer case 30 and the wound body, and a wound body internal space S1 is reduced after the impregnation with the electrolytic solution E; and a step of pressurizing the wound body external space S.

3 Claims, 29 Drawing Sheets

(51) Int. Cl.
    *H01M 10/0587*    (2010.01)
    *H01M 10/04*       (2006.01)
(52) U.S. Cl.
    CPC ... *H01M 10/0525* (2013.01); *H01M 10/0587*
                (2013.01); *H01M 2/365* (2013.01)

(56) References Cited

U.S. PATENT DOCUMENTS

| | | | | |
|---|---|---|---|---|
| 2003/0064285 | A1* | 4/2003 | Kawamura | H01M 2/0469 |
| | | | | 429/181 |
| 2011/0287292 | A1* | 11/2011 | Suyama | H01M 2/145 |
| | | | | 429/94 |
| 2012/0244402 | A1* | 9/2012 | Saeki | H01M 10/0431 |
| | | | | 429/94 |
| 2012/0328917 | A1 | 12/2012 | Sakashita et al. | |
| 2013/0065111 | A1* | 3/2013 | Kim | H01M 2/38 |
| | | | | 429/163 |
| 2013/0071712 | A1* | 3/2013 | Sasaki | H01M 10/0431 |
| | | | | 429/94 |
| 2013/0081264 | A1 | 4/2013 | Egusa et al. | |
| 2014/0117940 | A1* | 5/2014 | Takahata | H01M 4/13 |
| | | | | 320/134 |
| 2014/0315072 | A1* | 10/2014 | Kobayashi | H01M 2/0217 |
| | | | | 429/156 |
| 2015/0135522 | A1* | 5/2015 | Seto | H01M 2/0207 |
| | | | | 29/623.2 |
| 2015/0207182 | A1* | 7/2015 | Tsukui | H01M 10/0431 |
| | | | | 429/185 |

FOREIGN PATENT DOCUMENTS

| | | | | |
|---|---|---|---|---|
| JP | WO 2012169030 A1 * | 12/2012 | | H01M 4/13 |
| JP | 2013-008550 A | 1/2013 | | |
| JP | 2013-077404 A | 4/2013 | | |
| JP | 2013-093122 A | 5/2013 | | |
| JP | 2013-110033 A | 6/2013 | | |
| JP | 2013-152834 A | 8/2013 | | |
| WO | WO-2014010024 A1 * | 1/2014 | | H01M 10/0431 |

\* cited by examiner

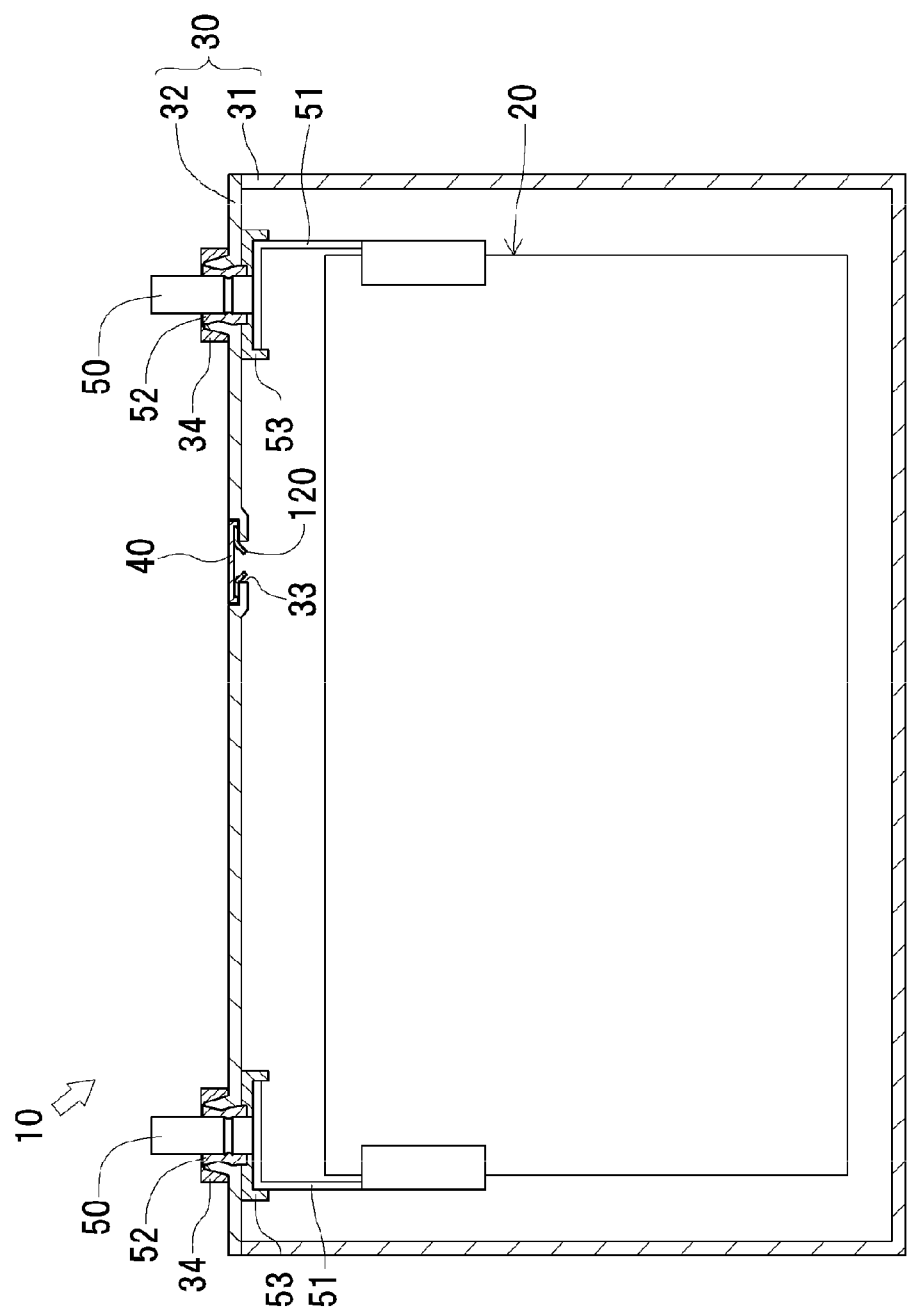

FIG.13

| DEPRESSURIZATION CONDITIONS | | FIRST EMBODIMENT | FIRST COMPARATIVE EXAMPLE | SECOND COMPARATIVE EXAMPLE | THIRD COMPARATIVE EXAMPLE |
|---|---|---|---|---|---|
| DEPRESSURIZATION TIMING | | BEFORE POURING | BEFORE POURING | AFTER POURING | AFTER POURING |
| DEGREE OF VACUUM | | HIGH | LOW | LOW | HIGH |
| RESULTS | IMMEDIATELY AFTER POURING | | | | |
| | DURING IMPREGNATION | | | | |
| | IMMEDIATELY AFTER PRESSURIZATION | | | | |

FIG.14
| IMPREGNATION CONDITIONS | | FIRST EMBODIMENT | FOURTH COMPARATIVE EXAMPLE | FIFTH COMPARATIVE EXAMPLE |
|---|---|---|---|---|
| | DEGREE OF VACUUM | HIGH | LOW | HIGH |
| | PRESSURE IN OUTER CASE AFTER POURING | ATMOSPHERIC PRESSURE | ATMOSPHERIC PRESSURE | HIGH PRESSURE |
| | CANCELATION OF PRE-SEALING | YES | NO | NO |
| RESULTS | | 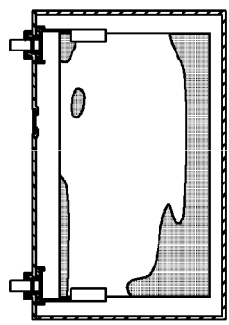 | 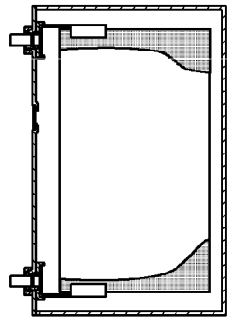 | 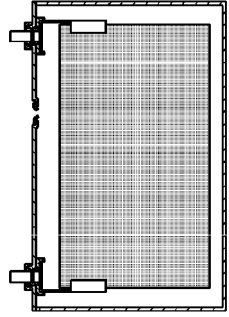 |

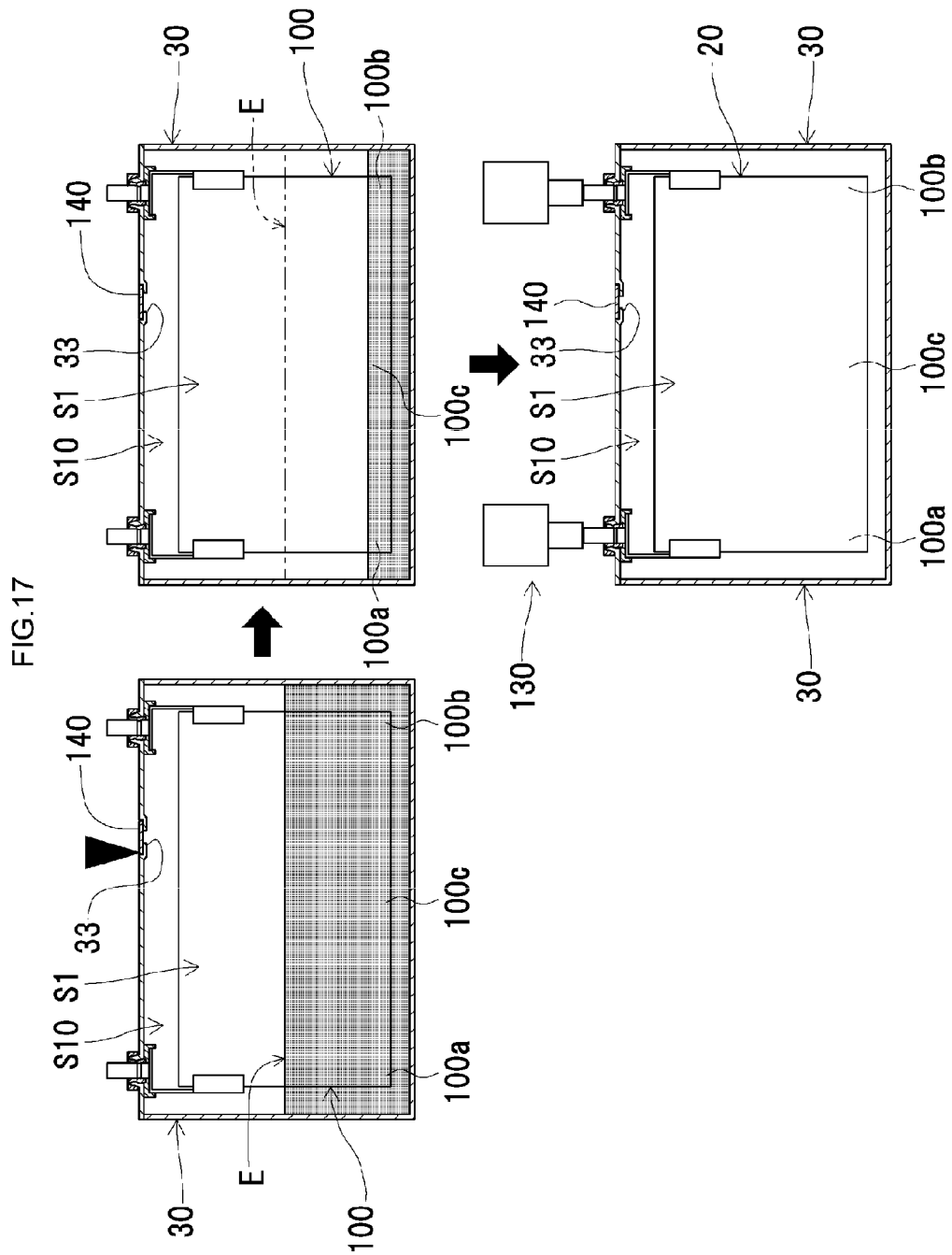

US 10,396,342 B2

METHOD FOR MANUFACTURING SECONDARY CELL HAVING A WOUND BODY EFFECTIVELY IMPREGNATED WITH ELECTROLYTIC SOLUTION

CROSS REFERENCE TO RELATED APPLICATIONS

This is a National Stage of International Application No. PCT/JP2014/076567 filed Oct. 3, 2014, claiming priority based on Japanese Patent Application No. 2013-214628 filed Oct. 15, 2013 and Japanese Patent Application No. 2014-049161 filed Mar. 12, 2014, the contents of all of which are incorporated herein by reference in their entirety.

TECHNICAL FIELD

The present invention relates to a method for manufacturing a secondary cell, the method including a step of pouring an electrolytic solution into a cell case.

BACKGROUND ART

In the conventional process for manufacturing a secondary cell such as a lithium ion secondary cell, a wound body obtained by winding a positive electrode, a negative electrode, and separators is housed in a transversely oriented posture in an outer case.

Further, in the process for manufacturing a secondary cell, an electrolytic solution is poured into the outer case, a cell case is then hermetically closed, and the wound body is impregnated with the electrolytic solution.

With the technique disclosed in Patent Literature 1, an opening of a case (cell case) is closed, the pressure inside the case is reduced, and an electrolytic solution is poured into the depressurized case.

With the technique disclosed in Patent Literature 1, the pressure inside the case is raised to a pressure higher than the atmospheric pressure to impregnate the wound body with the electrolytic solution, while pouring the electrolytic solution (or at the same time of pouring of the electrolytic solution).

Immediately after the pouring, the electrolytic solution permeates into both axial end portions of the wound body due to a capillary effect. As a result, a hermetically closed space is formed inside the wound body.

When the pressure inside the case is raised while pouring the electrolytic solution, as with the technique disclosed in Patent Literature 1, the air inside the pressurized case pushes away the electrolytic solution which has permeated in the both axial end portions of wound body, as depicted in FIG. 20, and the air can penetrate into the wound body (see the arrows in FIG. 20).

In other words, in this case, the air can remain in the air introduction path and in the axially central portion of the wound body.

As described hereinabove, with the technique disclosed in Patent Literature 1, the wound body cannot be effectively impregnated with the electrolytic solution.

CITATION LIST

Patent Literature

[PTL 1] Japanese Patent Application Publication No. H9-102443.

SUMMARY OF INVENTION

Technical Problem

The present invention has been created with the foregoing in view, and it is an objective of the present invention to provide a method for manufacturing a secondary cell which makes it possible to impregnate a wound body effectively with an electrolytic solution.

Solution to Problem

A method for manufacturing a secondary cell according to a first aspect of the present invention includes a step of depressurizing an interior of a cell case; a step of pouring an electrolytic solution into the depressurized cell case; a step of impregnating a wound body with the electrolytic solution from both axial end portions of the wound body; a step of increasing the impregnated amount of the electrolytic solution in the both axial end portions of the wound body in order to reduce a difference in pressure between a wound body external space, which is a space between the cell case and the wound body, and a wound body internal space, which is an internal space of the wound body, after the impregnation with the electrolytic solution, and air-tightly sealing the wound body internal space, which is the internal space of the wound body, and the wound body external space, which is the space between the cell case and the wound body, with the impregnated electrolytic solution; and a step of pressurizing the wound body external space, which has been reduced in the difference in pressure.

A method for manufacturing a secondary cell according to a second aspect of the present invention further includes a step of hermetically closing the cell case after the electrolytic solution has been poured to the cell case.

A method for manufacturing a secondary cell according to a third aspect of the present invention involves waiting until an equilibrium of pressures in the wound body external space and the wound body internal space is reached in the air-tight sealing step.

In a method for manufacturing a secondary cell according to a fourth aspect of the present invention, the cell case is opened to the atmosphere in the step of pressurizing the wound body external space.

In a method for manufacturing a secondary cell according to a fifth aspect of the present invention, the cell case is pressurized from the outside in the step of pressurizing the wound body external space.

In a method for manufacturing a secondary cell according to a sixth aspect of the present invention, a step of expanding the cell case to the outside is performed before the step of depressurizing the interior of the cell case, and in the step of pressurizing the wound body external space, the cell case, which has been expanded to the outside, is pressurized to compress the cell case in a direction opposite to a direction of the expansion.

In a method for manufacturing a secondary cell according to a seventh aspect of the present invention, in the step of pressurizing the wound body external space, the cell case is compressed to pressurize the wound body external space to a pressure equal to or higher than the atmospheric pressure.

A method for manufacturing a secondary cell according to an eighth aspect of the present invention includes an evacuation step of evacuating the interior of a cell case in a state in which an electrode body is housed in the cell case; a pouring step of pouring an electrolytic solution into the cell case; and a sealing step of sealing the cell case, wherein the evacuation step includes an air-tight sealing step of producing a negative pressure inside the electrode body and air-tightly sealing the interior of the electrode body with respect to the exterior of the electrode body in a state with a negative pressure inside the electrode body, and an atmosphere opening step of opening the inside of the cell case to the atmosphere in a state in which the interior of the electrode body is air-tightly sealed with respect to the exterior of the electrode body; and the sealing step is performed in a state in which the interior of the electrode body is air-tightly sealed with respect to the exterior of the electrode body, and the inside of the cell case is open to the atmosphere.

In a method for manufacturing a secondary cell according to the eighth aspect of the present invention, the air-tight sealing step is performed by impregnating end portions of the electrode body with the electrolytic solution.

In a method for manufacturing a secondary cell according to a ninth aspect of the present invention, the air-tight sealing step is performed by impregnating end portions of the electrode body with the electrolytic solution by a capillary effect.

Advantageous Effects of Invention

The effect of the present invention is that the wound body can be effectively impregnated with the electrolytic solution.

BRIEF DESCRIPTION OF DRAWINGS

FIG. 1 is an explanatory drawing illustrating the entire configuration of the cell.

FIGS. 2 (a) and 2(b) are explanatory drawings illustrating how a wound body is manufactured.

FIG. 5(a) illustrates the operation during the decompression step; and FIG. 5(b) illustrates the operation during the pouring step.

FIG. 6(a) is a cross-sectional view; and FIG. 6(b) is a perspective view of the wound body.

FIG. 8(a) is a cross-sectional view; and FIG. 8(b) is a perspective view of the wound body.

FIG. 11(a) is a cross-sectional view; and FIG. 11(b) is a perspective view of the wound body.

FIG. 12(a) illustrates how a portion of the wound body which has been impregnated with the electrolytic solution is confirmed; and FIG. 12(b) illustrates how a portion of the wound body which has not been impregnated with the electrolytic solution is confirmed.

FIG. 13 illustrates the results obtained in evaluating the first embodiment and first to third comparative examples.

FIG. 14 illustrates the results obtained in evaluating the first embodiment, fourth comparative example, and fifth comparative example.

FIG. 16(a) illustrates the state of the outer case in the very middle of the outer case expansion; and FIG. 16(b) illustrates the state of the outer case after the expansion.

FIG. 17 is an explanatory drawing illustrating the steps of the second embodiment from the main sealing step to the initial charging step.

FIG. 21(a) is a cross-sectional view; FIG. 21(b) is a perspective view of the wound body; and FIG. 21(c) is a perspective view of the outer case.

DESCRIPTION OF EMBODIMENTS

Figure 2A:
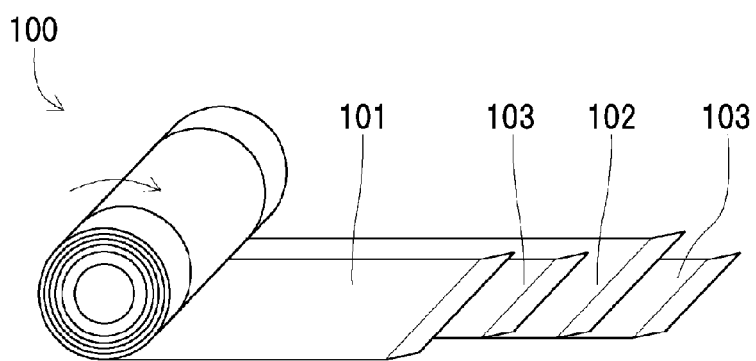
FIG. 2(a) shows how a positive electrode, a negative electrode, and separators are wound.

A method for manufacturing a hermetically sealed cell according to the first embodiment (referred to hereinbelow simply as "manufacturing method") will be described hereinbelow.

Initially, the general configuration of the cell of the embodiments of the secondary cell in accordance with the present invention will be described.

A cell 10 of the first embodiment is a hermetically sealed lithium ion secondary cell. The application object of the present invention is not intended to be limited to a lithium ion secondary cell and can be another secondary cell such as a nickel hydride secondary cell.

As depicted in FIG. 1, the cell 10 is equipped with a power-generating element 20, an outer case 30, a cap 40, and external terminals 50.

Figure 2B:
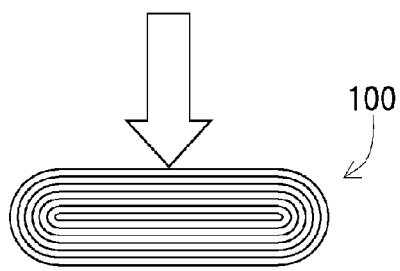
FIG. 2(b) shows how the wound body is press processed.
Figure 3:
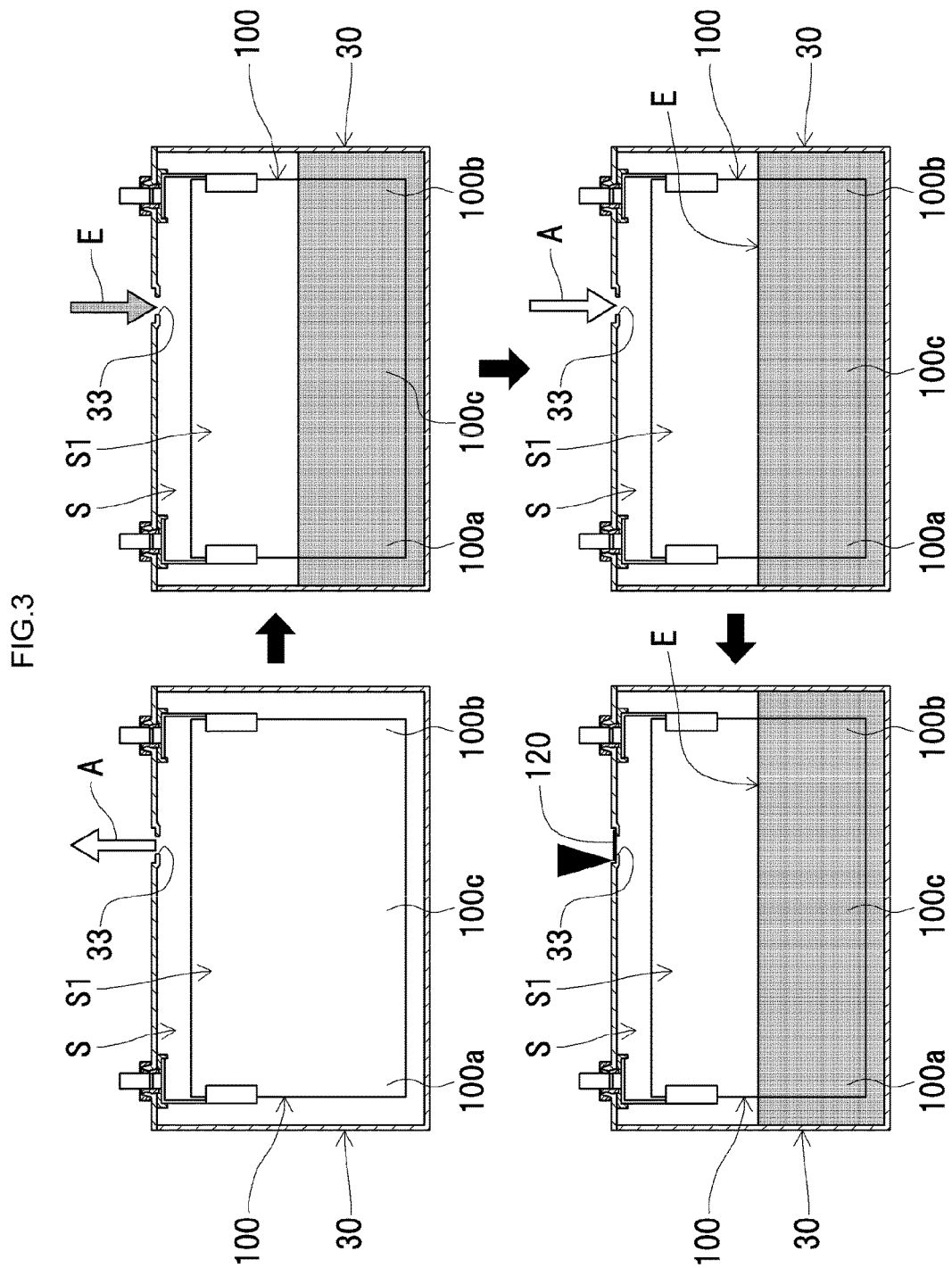
FIG. 3 is an explanatory drawing illustrating the steps of the first embodiment from a decompression step to a hermetic closing step.

The power-generating element 20 is obtained by impregnating a wound body 100, in which a positive electrode 101, a negative electrode 102, and separators 103 are wound, with an electrolytic solution E (see FIG. 2 and FIG. 3). During charging and discharging of the cell 10, a chemical reaction is induced inside the power-generating element 20 (strictly speaking, ions migrate through the electrolytic solution E between the positive electrode 101 and the negative electrode 102), thereby generating the flow of electric current.

The outer case 30, which is the cell case, is an angular column-like case formed in a substantially rectangular shape in the plan view for which the left-right direction in FIG. 1 is a longitudinal direction. The outer case 30 has a housing portion 31 and a lid 32.

The housing portion 31 is an open-end angular tubular member which is closed at the bottom surface and side surfaces and open at the upper surface. The power-generating element 20 is housed inside thereof.

The lid 32 is a flat-plate member shaped correspondingly to the open surface of the housing portion 31 and joined to the housing portion 31 such as to close the open surface of the housing portion 31. A pouring hole 33 for pouring the electrolytic solution E is formed, as described hereinbelow, in the lid 32 between the locations through which the external terminals 50 are inserted.

The pouring hole 33 is a hole passing through the plate surface of the lid 32, that is, a hole formed in the upper surface of the outer case 30. The pouring hole 33 is a substantially round hole, in the plan view thereof, in which the inner diameter on the outer side of the lid 32 is different from that on the inner side. The pouring hole 33 is formed such that the inner diameter on the upper side (outer side) is larger than that on the lower side (inner side), and a step portion is formed in the vertically intermediate portion.

A substantially round, in the plan view thereof, film 120 is welded to the step portion in the process for manufacturing the cell 10. The film 120 is pierced in the process for manufacturing the cell 10. Therefore, in FIG. 1 depicting the completed cell 10, the film 120 is in the pierced state.

A cap 40 is a lid sealing the pouring hole 33. The lower surface of the cap 40 is shaped in a form such as to cover the film 120 from the outside. The outer diameter of the cap 40 is substantially equal to the inner diameter on the upper side of the pouring hole 33.

The cap 40 is provided at the step portion of the pouring hole 33 and joined to the lid 32 by laser welding the outer circumferential edge portion thereof.

The external terminals 50 are disposed in a state in which part thereof protrudes above (outside of) the cell 10 from the outside surface of the lid 32. The external terminals 50 are electrically connected to the positive electrode 101 or the negative electrode 102 of the power-generating element 20 through current-collecting terminals 51. The external terminals 50 are fixed in the electrically insulated state to the lid 32, with insulating members 52, 53 being interposed therebetween, by fitting a fixing member 34 into the outer circumferential surface portion thereof. The external terminals 50 and the current-collecting terminals 51 function as conduction paths for taking power stored in the power-generating element 20 to the outside, or for taking the power from the outside into the power-generating element 20.

The current-collecting terminals 51 are electrically connected to the positive electrode plate and negative electrode plate of the power-generating element 20. As for the materials of the current-collecting terminals 51, for example, aluminum can be used on the positive electrode side and copper can be used on the negative electrode side.

Regions of the external terminals 50 that protrude outward of the cell 10 are threaded by thread rolling, and bolt portions are formed. When the cell 10 is actually used, those bolt portions are used to fasten the bus bars and connection terminals of an external device to the external terminals 50.

When the fastening is performed, a fastening torque is applied to the external terminals 50, and an external force is provided in the axial direction as a result of bolt fastening. Therefore, it is preferred that a high-strength material such as iron be used for the external terminals 50.

The manufacturing method of the first embodiment will be explained hereinbelow.

Initially, in the manufacturing method, mixes (a positive electrode mix and a negative electrode mix) are coated on the surfaces of collectors (a positive electrode collector and a negative electrode collector) by using a coating machine such as a die coater, and the mixes are thereafter dried.

Then, in the manufacturing method, press processing is performed with respect to the mixes on the surfaces of the collectors, thereby forming mix layers (a positive electrode mix layer and a negative electrode mix layer) on the surfaces of the collectors and producing a positive electrode 101 and a negative electrode 102.

As depicted in FIG. 2, in the manufacturing method, separators 103 are sandwiched between the positive electrode 101 and the negative electrode 102 to form a laminate.

In the manufacturing method, the positive electrode 101 and the negative electrode 102, with the separator 103 interposed therebetween, are wound about the axial direction of the positive electrode 101 as a winding axis direction, and press processing is implemented with respect to the outer circumferential surface of the wound configuration to produce a wound body 100 (see the arrow in FIG. 2(b)).

Then, in the manufacturing method, the external terminals 50 and the current-collecting terminals 51 which have been integrated with the lid 32 of the outer case 30 are connected to the wound body 100, and the wound body 100 is housed in the housing portion 31 of the outer case 30. Then, in the manufacturing method, the housing portion 31 of the outer case 30 and the lid 32 are joined by welding to seal the case.

At this time, as depicted in FIGS. 2 and 3, in the manufacturing method, the wound body 100 is housed in the transverse posture of the wound body 100, that is, so that the axial direction (winding axis direction) of the wound body 100 is parallel to the longitudinal direction of the outer case 30.

In other words, in FIG. 3, the axial direction of the wound body 100 is the left-right direction.

The inner space of the wound body 100, that is, gaps formed between the laminated surfaces of the positive electrode 101, negative electrode 102, and separators 103, will be referred to hereinbelow as "wound body internal space S1".

Further, a space between the outer case 30 and the wound body 100, that is, a space obtained by removing the wound body internal space S1 from the inner space of the outer case 30, will be referred to hereinbelow as "wound body external space S".

As depicted in FIG. 3, after the outer case 30 has been sealed, in the manufacturing method, a depressurization step is performed for releasing the air inside the outer case 30 which is arranged under an atmosphere of 1 atm from the pouring hole 33 and depressurizing the interior of the outer case 30 (see an upward arrow A in FIG. 3).

In this case, in the manufacturing method, the interior of the outer case 30 is depressurized to a high degree of vacuum. The air of the wound body internal space S1 exits into the wound body external space S through both axial end portions 100a, 100b of the wound body 100 and is released to the outside.

After the interior of the outer case 30 has been decompressed, in the manufacturing method, a pouring step is performed for pouring the electrolytic solution E into the decompressed outer case 30 through the pouring hole 33 (see an arrow E in FIG. 3).

Figure 4:
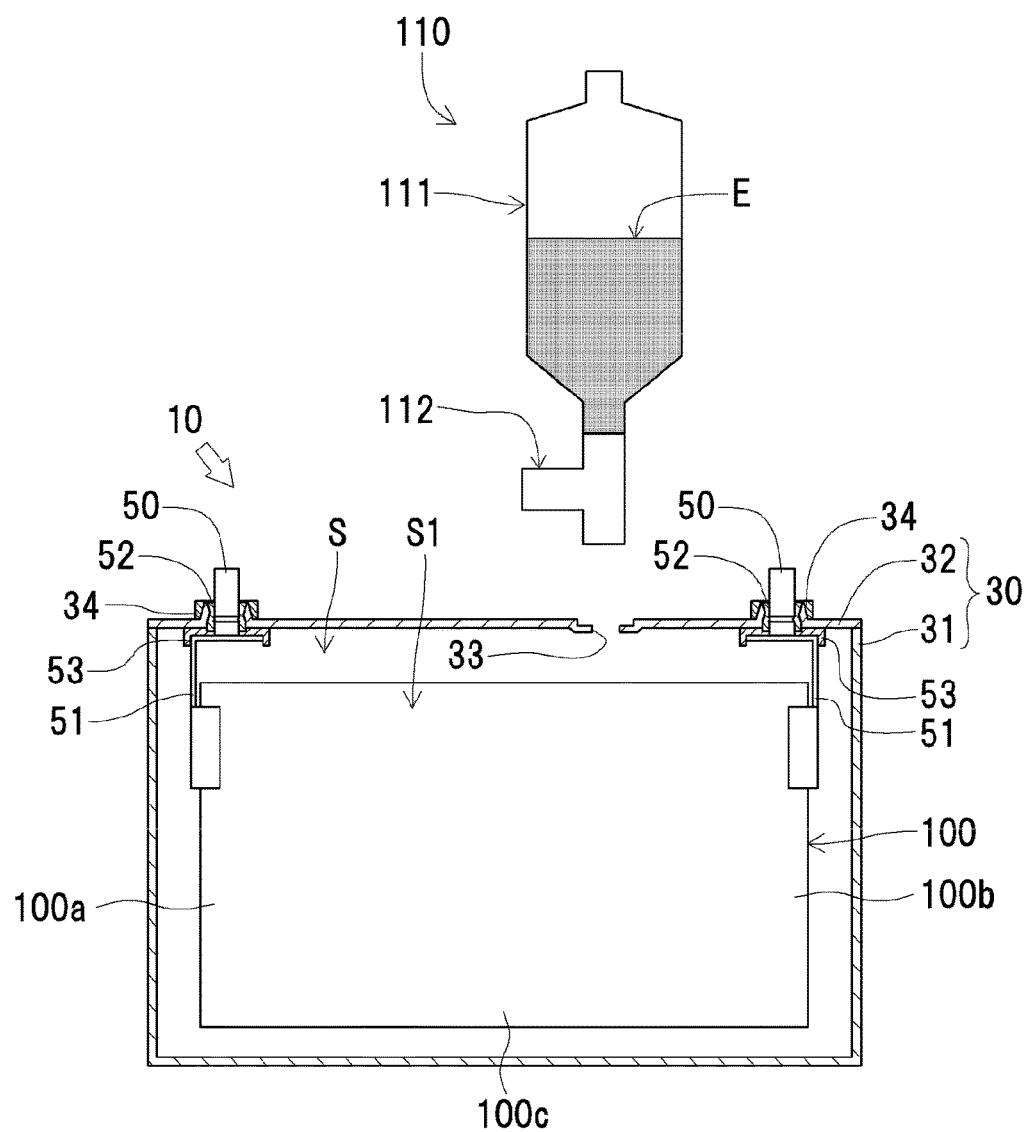
FIG. 4 is an explanatory drawing illustrating a pouring unit.

Such decompression step and pouring step are performed, for example, by using a pouring unit 110 such as depicted in FIG. 4.

As depicted in FIG. 4, in the pouring unit 110, a pouring pot 111 storing the electrolytic solution E inside thereof is connected to a port above a three-way valve 112, and a vacuum pump is connected to a port on the left side of the three-way valve 112.

The pouring unit 110 is disposed above the outer case 30 and configured to be movable in the vertical direction, that is, liftable and lowerable. In the state depicted in FIG. 4, the port below the three-way valve 112 is not connected to any other member.

Figure 5A:
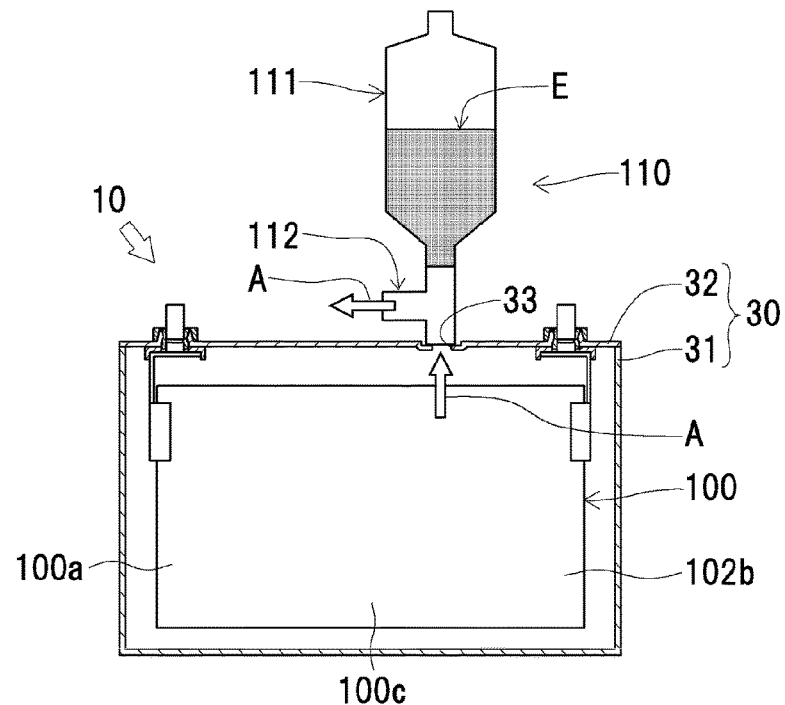
FIGS. 5(a) and 5(b) are explanatory drawings illustrating how the pouring unit is operated.

As depicted in FIG. 5(a), in the manufacturing process, when the decompression step is performed, the pouring unit 110 is lowered, the three-way valve 112 is brought into contact with the step portion of the pouring hole 33, the pouring hole 33 is sealed, and the outer case 30 is connected to the port below the three-way valve 112.

Then, in the manufacturing method, the three-way valve 112 is controlled to communicate the outer case 30 with the vacuum pump, and the vacuum pump is driven to depressurize the interior of the outer case 30.

Figure 5B:
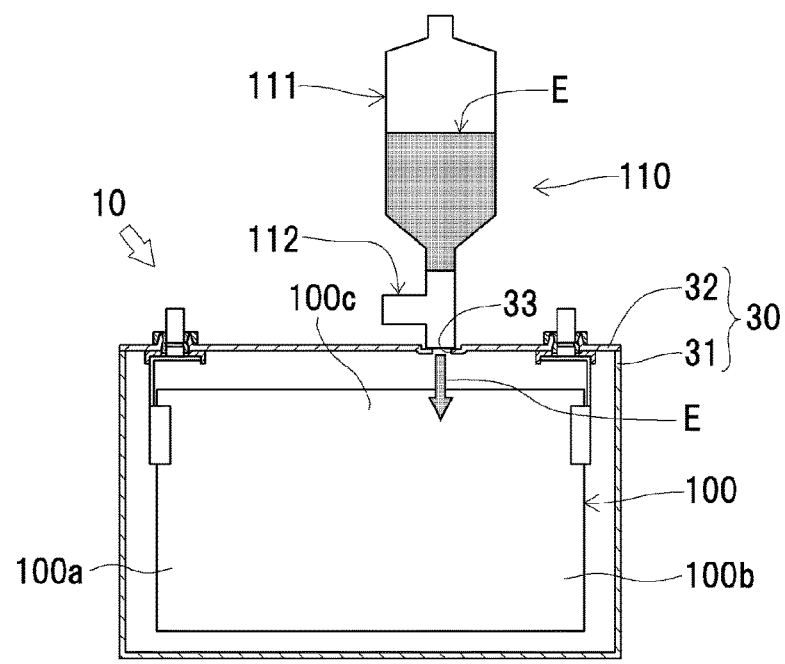

As depicted in FIG. 5(b), after the outer case 30 has been depressurized, in the manufacturing method, the three-way valve 112 is controlled to communicate the outer case 30 with the pouring pot 111, and the electrolytic solution E is poured into the outer case 30 by using the difference between the pressure inside the outer case 30 and the pressure inside the vacuum pod.

Figure 6A:
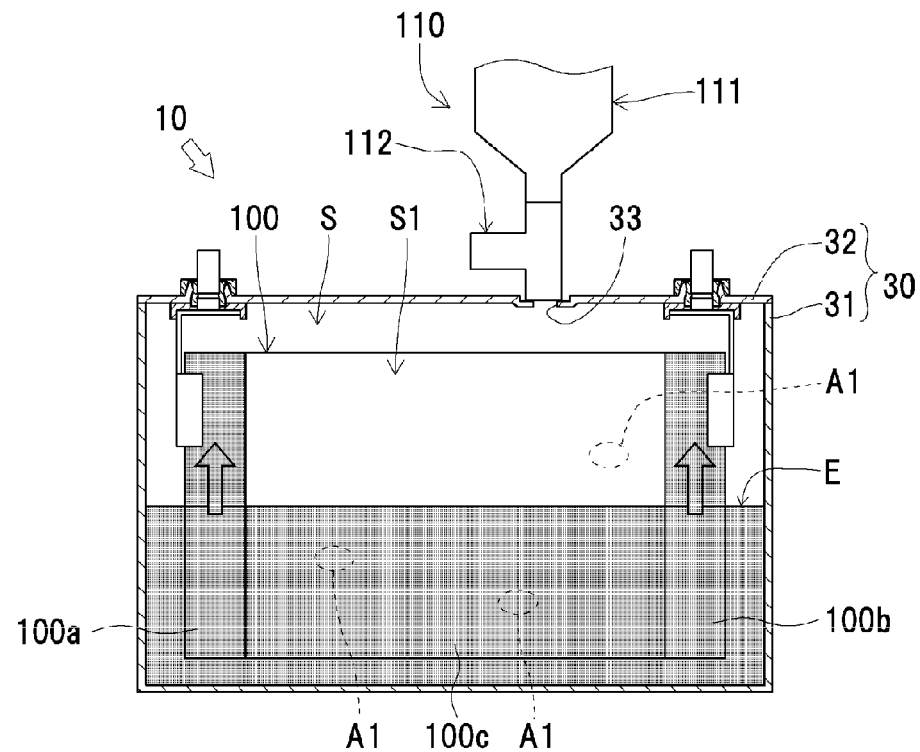
FIGS. 6(a) and 6(b) are explanatory drawings illustrating the degree of impregnation of the electrolytic solution in the pouring step.
Figure 6B:
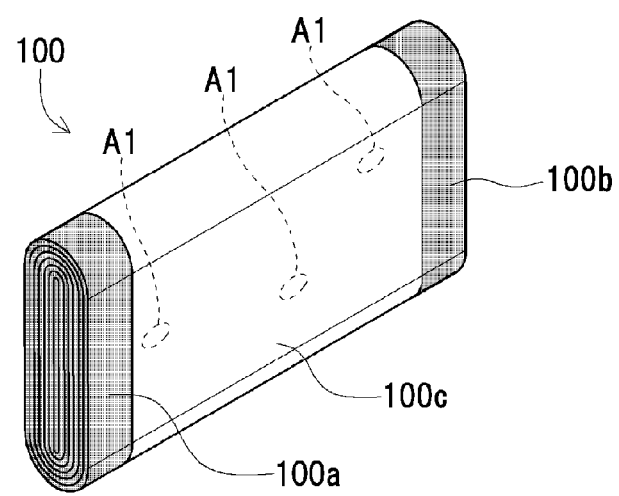

In this case, as depicted in FIG. 6, immediately after the pouring, the both axial end portions 100a, 100b of the wound body 100 are actively impregnated with the electrolytic solution E due to the capillary effect (see an arrow in FIG. 6).

As a result, the both axial end portions 100a, 100b of the wound body 100 are impregnated with the electrolytic solution E such that no air remains between the laminated surfaces of the positive electrode 101, negative electrode 102, and separators 103.

Therefore, the wound body internal space S1 is isolated from the wound body external space S by the electrolytic solution E immediately after the pouring and becomes a sealed space.

In other words, the air A1 inside the wound body 100 is enclosed in the wound body 100 immediately after the pouring.

Thus, the manufacturing method includes the step of impregnating the wound body 100 with the electrolytic solution E from the both axial end portions of the wound body 100.

As depicted in FIG. 3, after the electrolytic solution E has been poured into the outer case 30, in the manufacturing method, the pressure inside the outer case 30 is restored to the atmospheric pressure (in the first embodiment, 1 atm) (see the downward arrow A in FIG. 3).

At this time, in the manufacturing method, the pouring unit 110 is lifted from the state depicted in FIG. 6(a), and the outer case 30 is opened to the atmosphere. As a result, in the manufacturing method, the wound body external space S is returned to the atmospheric pressure.

The difference in pressure between the wound body external space S, which has been returned to the atmospheric pressure, and the wound body internal space S1 is about 1 atm at maximum, that is, small.

Therefore, the air introduced into the outer case 30 (wound body external space S) when it is opened to the atmosphere cannot push away the electrolytic solution E which has been impregnated into the both axial end portions 100a, 100b of the wound body 100.

For this reason, the wound body internal space S1 maintains the state of isolation from the wound body external space S, that is, the depressurized state, even after the outer case 30 has been opened to the atmosphere.

Further, in the manufacturing method, the pressure in the wound body external space may be made higher than the pressure in the wound body internal space, provided that the state in which the wound body internal space is isolated from the wound body external space is maintained even after the pouring step, ant it is not always necessary to return the wound body external space to the atmospheric pressure after the pouring step.

For example, in the manufacturing method, the wound body internal space may be pressurized after the pouring step to a pressure which is about several pascals higher or several pascals lower than the atmospheric pressure.

After the outer case 30 has been returned to the atmospheric pressure, in the manufacturing method, the film 120 is placed on the step portion of the pouring hole 33 and laser beam irradiation is performed with a laser welding apparatus along the outer edge portion of the cap 40 (see a black triangle in FIG. 3).

As a result, in the manufacturing method, a hermetic closing step is performed for welding the film 120 to the step portion of the pouring hole 33, pre-sealing (in other words, temporarily sealing) the pouring hole 33 by the film 120, and hermetically closing the outer case 30 into which the electrolytic solution has been poured. At this time, the wound body external space S becomes a hermetically closed space.

A method for pre-sealing the pouring hole is not limited to that of the first embodiment. For example, in the manufacturing method, the pouring hole may be pre-sealed by fitting a rubber plug into the pouring hole.

Figure 7:
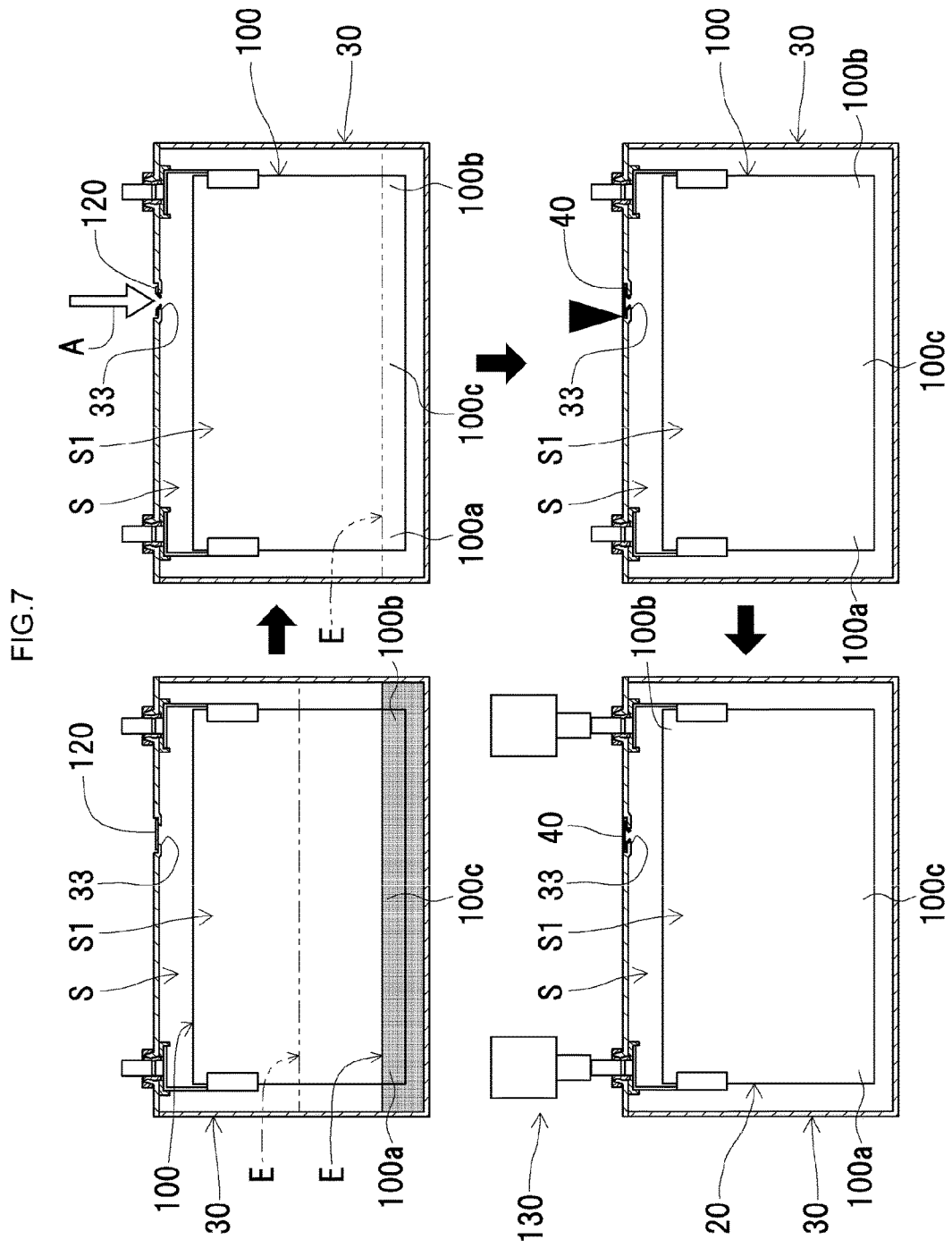
FIG. 7 is an explanatory drawing illustrating the steps of the first embodiment from the waiting step to the initial charging step.

As depicted in FIG. 7, after the hermetic closing step has been performed, in the manufacturing method, a waiting step is performed for waiting for a predetermined time until the wound body 100 is impregnated with the electrolytic solution E (see the outer case 30 depicted in the upper left portion of FIG. 7).

In the manufacturing method, as a result of performing the hermetic closing step before the waiting step (after the both axial end portions 100*a*, 100*b* of the wound body 100 have been impregnated with the electrolytic solution E), the air is prevented from permeating from the outside into the outer case 30 during the waiting step.

As a consequence, in the manufacturing method, the degradation of cell performance caused by the evaporation of the electrolytic solution E and the effect produced by moisture and oxygen contained in the air can be suppressed.

When the hermetic closing step and waiting step are performed, the pressure in the wound body external space S is the atmospheric pressure. Meanwhile, the pressure in the wound body internal space S1 is high vacuum, that is, a pressure close to the vacuum.

In other words, in the manufacturing method, the hermetic closing step and waiting step are performed in a state in which the pressure in the wound body external space S is higher than the pressure in the wound body internal space S1.

Figure 8A:
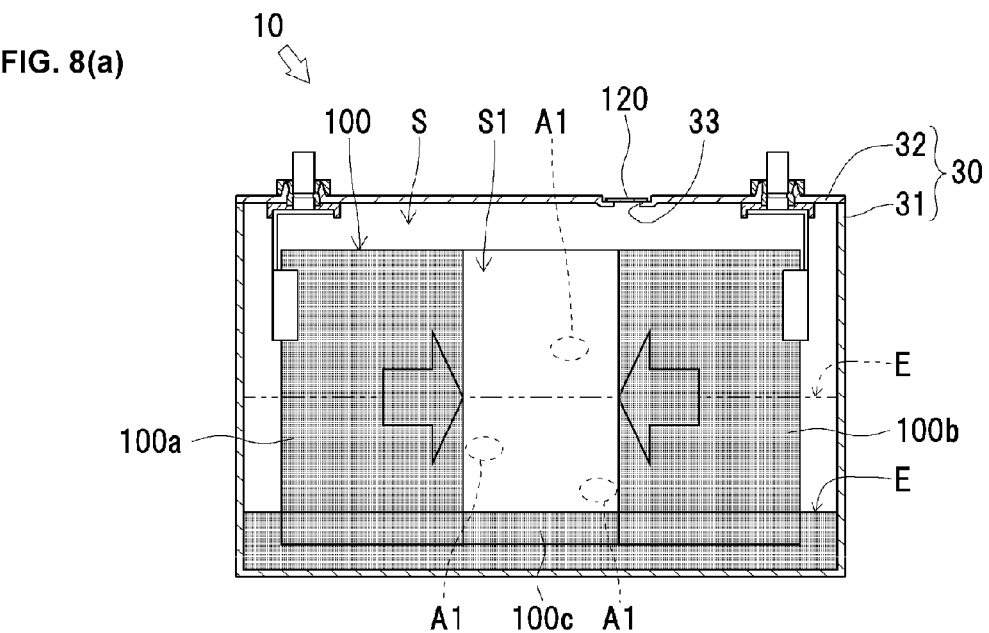
FIGS. 8(a) and 8(b) are explanatory drawings illustrating the degree of impregnation of the electrolytic solution in the waiting step.
Figure 8B:
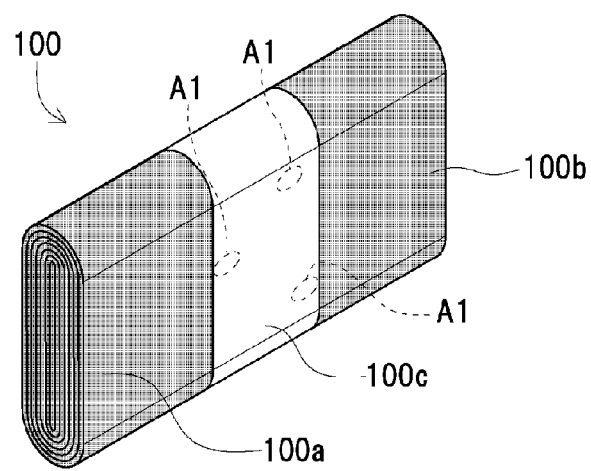

As a result, as depicted in FIG. 8, in the manufacturing method, the wound body 100 is impregnated with the electrolytic solution E such as to cover the difference in pressure between the wound body external space S and the wound body internal space S1.

More specifically, since the height position of the level of the electrolytic solution E is lowered following the impregnation with the electrolytic solution E, the volume of the wound body external space S increases.

Figure 9:
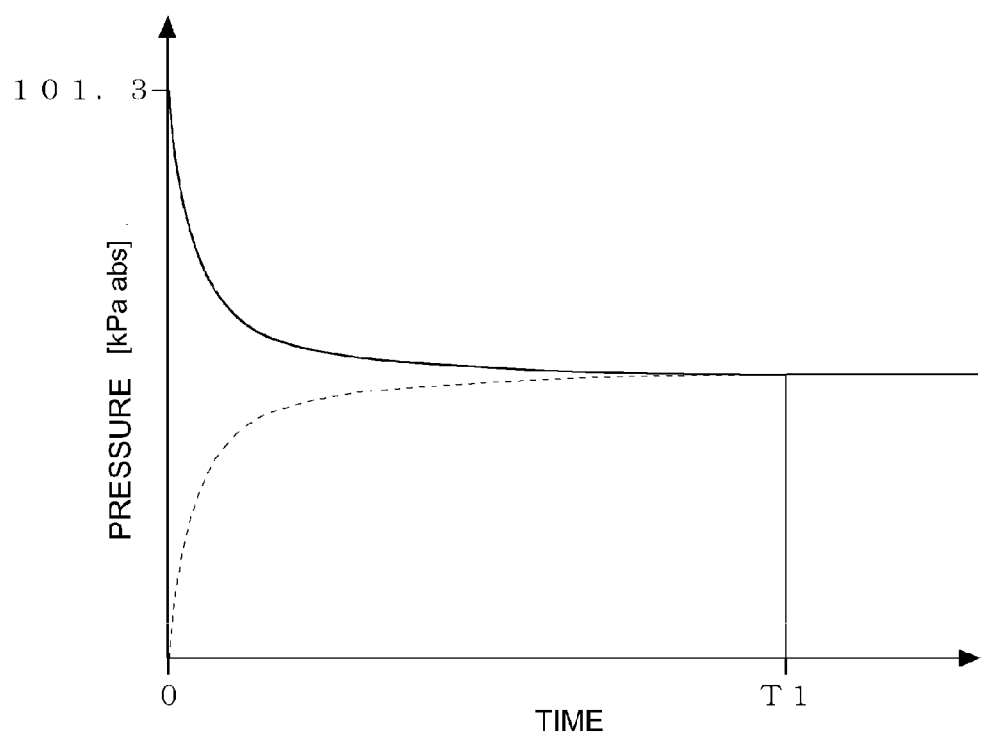
FIG. 9 depicts changes in pressure in the wound body external space and wound body internal space when the wound body is impregnated with the electrolytic solution by using a difference in pressure between the wound body external space and wound body internal space.

Therefore, as depicted in FIG. 8 and FIG. 9, the pressure in the wound body external space S after the hermetic closing step decreases following the impregnation with the electrolytic solution E (see the graph represented by a solid line in FIG. 9).

At the abscissa of the graph depicted in FIG. 9, the point of time at which the hermetic closing step is completed is taken as 0.

The impregnation with the electrolytic solution E proceeds from the both axial end portions 100*a*, 100*b* toward the axially central portion 100*c*, and the air A1 of the wound body internal space S1 is moved toward the axially central portion 100*c* of the wound body 100 (see the arrow depicted in FIG. 8(*a*)).

Therefore, the volume of the wound body internal space S1 decreases following the impregnation with the electrolytic solution E. As a result, the pressure in the wound body internal space S1 increases following the impregnation with the electrolytic solution E (see the graph represented by a dot line in FIG. 9).

In other words, in the manufacturing method, the difference in pressure between the wound body external space S and the wound body internal space S1 is eliminated by the impregnation with the electrolytic solution E by increasing in advance the pressure in the wound body external space S, in which the pressure decreases following the impregnation with the electrolytic solution E, and decreasing in advance the pressure in the wound body internal space S1, in which the pressure increases following the impregnation with the electrolytic solution E.

As a result, the manufacturing method makes it possible to impregnate the wound body 100 effectively with the electrolytic solution E by using the difference in pressure between the wound body external space S and the wound body internal space S1.

Therefore, the manufacturing method makes it possible to promote the impregnation of the wound body 100 with the electrolytic solution E.

Thus, the waiting step serves to reduce the difference in pressure between the wound body external space S and the wound body internal space S1 after the both width direction end portions 100*a*, 100*b* of the wound body 100 have been impregnated with the electrolytic solution E.

The wound body 100 is impregnated with the electrolytic solution E at a higher rate when the difference in pressure between the wound body external space S and the wound body internal space S1 is large. Therefore, the wound body 100 is actively impregnated with the electrolytic solution E directly after the hermetic closing step.

Since the difference in pressure between the wound body external space S and the wound body internal space S1 decreases following the impregnation with the electrolytic solution E, the rate at which the wound body 100 is impregnated with the electrolytic solution E decreases with the passage of time.

Further, the impregnation of the wound body 100 with the electrolytic solution E is stopped when the equilibrium (balance) of pressures in the wound body external space S and the wound body internal space S1 is reached (see time T1 depicted in FIG. 9).

Figure 10:
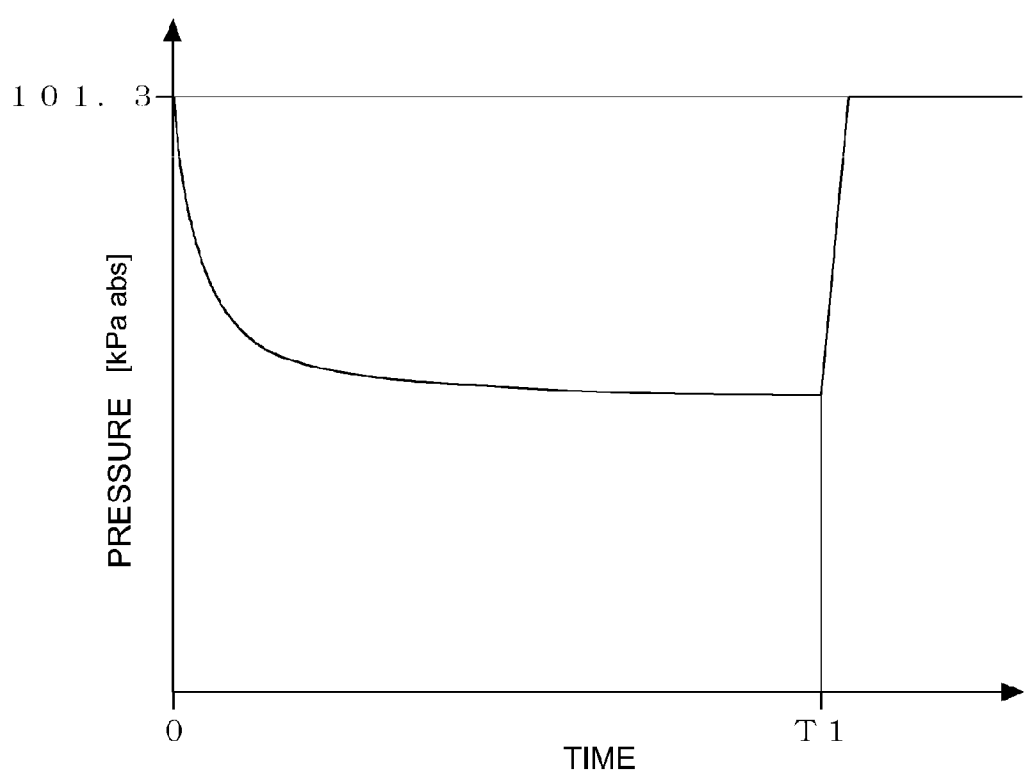
FIG. 10 is an explanatory drawing illustrating changes in pressure in the wound body external space during the waiting step and pressurization step.

Accordingly, as depicted in FIG. 8 and FIG. 10, the waiting step of the first embodiment involves waiting until the equilibrium of pressures in the wound body external space S and the wound body internal space S1 is reached (see time T1 depicted in FIG. 10).

The waiting time in such a waiting step is set, as appropriate, for example, to a time till a measurement result of a commercial pressure sensor measuring the pressure in the outer case 30, that is, in the wound body external space S, becomes constant.

At the abscissa of the graph depicted in FIG. 10, the point of time at which the hermetic closing step is completed is taken as 0.

Figure 12A:
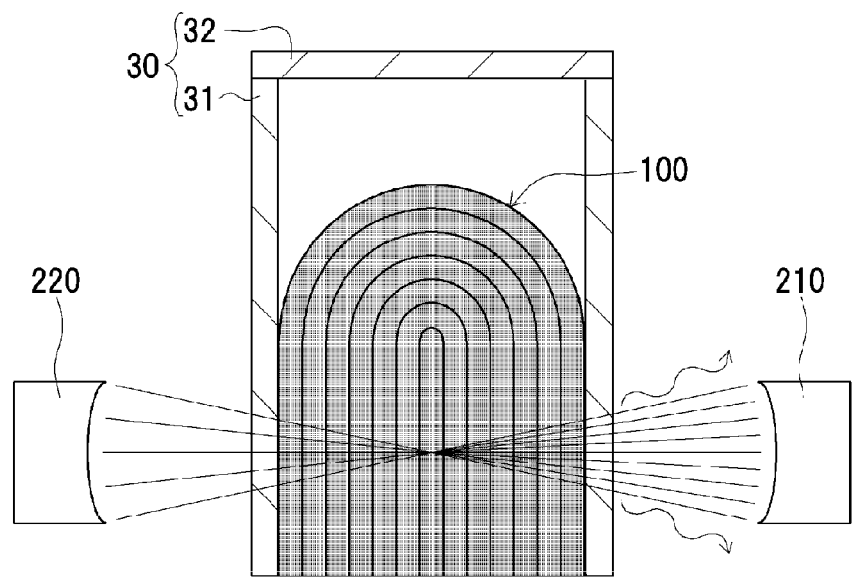
FIGS. 12(a) and 12(b) are explanatory drawings illustrating how the degree of impregnation of the electrolytic solution is confirmed.
Figure 12B:
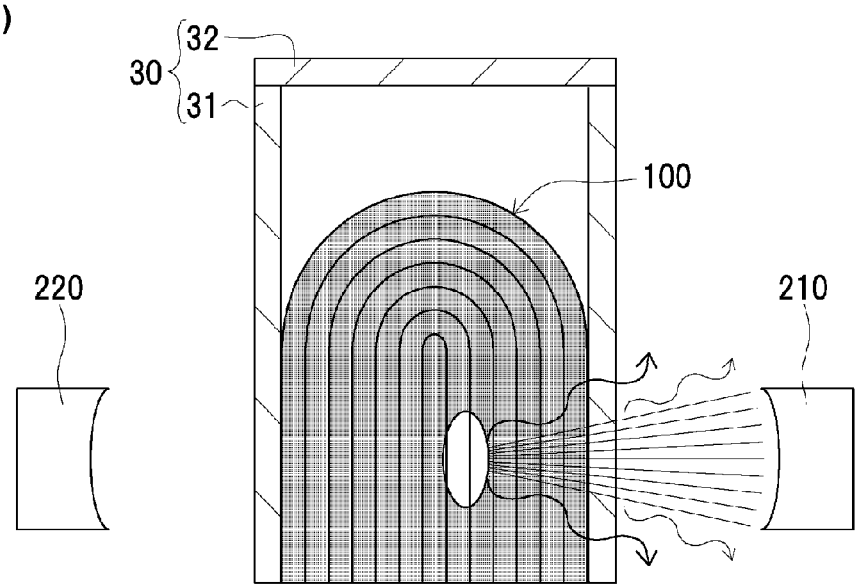

In this case the wound body 100 is housed in the outer case 30 in a state in which very small gaps are formed between the two side surfaces of the wound body in the thickness direction and the two side surfaces of the housing portion 31 in the lateral direction, or in a state in which the two side surfaces of the wound body in the thickness direction and the two side surfaces of the housing portion 31 are in intimate contact with each other (see FIG. 12).

Therefore, in the wound body external space S, in a state before the electrolytic solution E is poured, the space above and below the wound body 100 and also on the left and right thereof occupies most of the volume.

Further, when the electrolytic solution E is poured into the outer case 30, the volume of the wound body external space S is reduced, for example, by about half.

In other words, since the volume of the wound body external space S is small at the time the waiting step is started, the pressure easily decreases following the impregnation with the electrolytic solution E.

Therefore, even in the case of waiting until the equilibrium of pressures in the wound body external space S and the wound body internal space S1 is reached, the impregnation with the electrolytic solution E does not reach the axially central portion 100*c* of the wound body 100.

As depicted in FIG. 7, after the waiting step, in the manufacturing method, the film 120 is perforated with a cutting tool, or the like, and the outer case 30 is opened to the atmosphere, that is, the pre-sealing is canceled (see an arrow A in FIG. 7).

As a result, as depicted in FIG. 10, in the manufacturing method, the wound body external space S which has been at a pressure lower than the atmospheric pressure following the impregnation with the electrolytic solution E is returned to the atmospheric pressure (see time T1 in FIG. 10).

At this time, the difference in pressure between the wound body external space S and the wound body internal space S1 becomes less than 1 atm. The wound body 100 with respect to which the waiting step has been implemented is impregnated with the electrolytic solution E to a certain range (from the one axial end portion 100a to between the axially central portion 100c and the one axial end portion 100a, and from the other axial end portion 100b of the wound body 100 to between the axially central portion 100c and the other axial end portion 100b).

Therefore, the air introduced into the wound body external space S when the pre-sealing is canceled cannot push away the electrolytic solution E impregnated into the wound body 100.

As a result, even after the pre-sealing has been canceled, the wound body internal space S1 remains isolated from the wound body external space S, that is, remains at a pressure lower than the atmospheric pressure.

In other words, in the manufacturing method, the pressure in the wound body external space S can be made one more time higher than the pressure in the wound body internal space S1 by canceling the pre-sealing.

Thus, in the manufacturing method, the pressurization step is performed for pressurizing the wound body external space S relative to the wound body internal space S1, after the difference in pressure between these has been reduced, by opening the outer case 30 to the atmosphere.

Figure 11A:
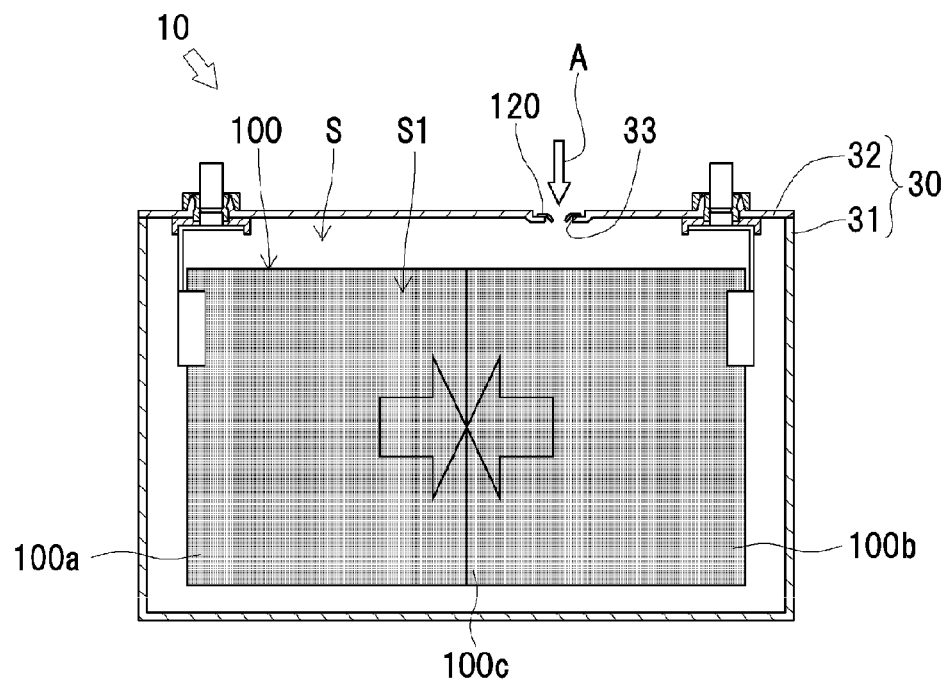
FIGS. 11(a) and 11(b) are explanatory drawings illustrating the degree of impregnation of the electrolytic solution during the pressurization step.
Figure 11B:
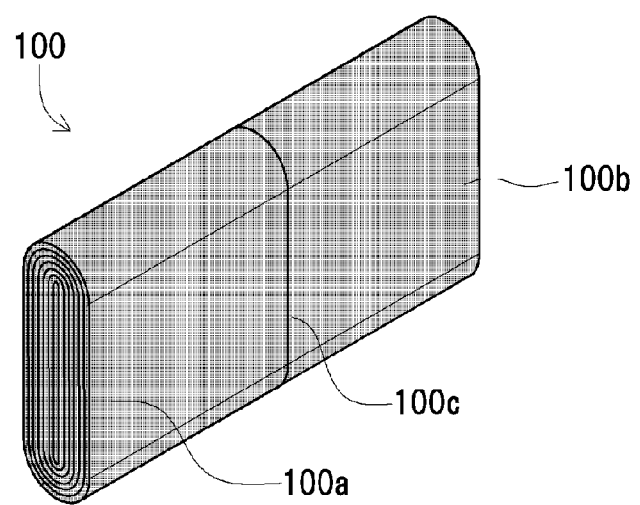

As a result, as depicted in FIGS. 11(a) and 11(b), in the manufacturing method, the wound body 100 can be one more time impregnated with the electrolytic solution E by making use of the difference in pressure between the wound body external space S and the wound body internal space S1 (see the arrow depicted in FIG. 11(a)).

At this time, in the manufacturing method, active impregnation with the electrolytic solution E is performed with respect to the wound body 100 which has been impregnated to a certain extent with the electrolytic solution E, that is, the wound body 100 in which the volume of the wound body internal space S1 has been somewhat reduced.

Therefore, in the manufacturing method, the air A1 in the wound body internal space S1 can be confined to a very small region in the axially central portion 100c of the wound body 100 immediately after the pre-sealing has been canceled. In other words, in the manufacturing method, the wound body internal space S1 can be compressed into a very small region in the axially central portion 100c of the wound body 100 by making use of the difference in pressure between the wound body external space S and the wound body internal space S1.

Further, in the manufacturing method, the amount of the air A1 in the wound body internal space S1 is reduced by releasing most of the air in the wound body internal space S1 to the outside in the decompression step.

Therefore, in the manufacturing method, almost the entire region, except for the very small region in the axially central portion 100c of the wound body 100, can be impregnated with the electrolytic solution E immediately after the pre-sealing has been canceled.

As a result, in the manufacturing method, the wound body 100 can be effectively impregnated with the electrolytic solution E.

Further, in the manufacturing method, the pressurization step can be performed easily by opening the outer case to the atmosphere, without using any equipment for adjusting the pressure inside the outer case.

In the manufacturing method of the first embodiment, in the waiting step, it is not always necessary to wait until the equilibrium of pressures in the wound body external space and the wound body internal space is reached.

However, it is preferable to wait in the waiting step until the equilibrium of pressures in the wound body external space S and the wound body internal space S1 is reached as in the manufacturing method of the first embodiment.

As a result, in the manufacturing method, the volume of the wound body internal space S1 can be further reduced before the pressurization step. Therefore, in the manufacturing method, the impregnation with the electrolytic solution E during the pressurization step makes it possible to compress the wound body internal space S1 to a narrow region which is almost impossible to recognize visually.

In other words, in the manufacturing method, the entire surface of the wound body 100, that is, the wound body 100 from one axial end portion 100a to the other axial end portion 100b thereof, can be reliably impregnated with the electrolytic solution E.

As depicted in FIG. 7, in the manufacturing method, the main sealing step of sealing the pouring hole 33 is performed after the pressurization step.

At this time, in the manufacturing method, the cap 40 is placed on the pouring hole 33 and laser beam irradiation is performed along the outer edge of the cap 40 with a laser welding machine to seal the pouring hole 33 (see the black triangle in FIG. 7).

In the manufacturing method, after the main sealing, an initial charging step of initially charging the cell 10 is performed.

At this time, in the manufacturing method, the outer case 30 is restrained with a restraining jig, and a load of a predetermined value is applied to the outer case 30 in the thickness direction (depthwise direction with respect to the plane in FIG. 7) of the outer case 30. Then, in the manufacturing method, electrodes of a power source device 130 are connected to the external terminals 50, and the cell 10 is initially charged.

A coating film is formed on the wound body 100 by performing such an initial charging step.

After the initial charging has been performed, in the manufacturing method, voltage inspection is performed and the restraint of the outer case 30 with the restraining jig is released.

In the manufacturing method, the cell 10 is thus manufactured.

With the manufacturing method of the first embodiment, by performing the pressurization step, it is possible to impregnate the entire surface of the wound body 100 with the electrolytic solution E prior to performing the initial charging step.

In other words, in the manufacturing method, since the initial charging step can be performed after eliminating the impregnation unevenness, a uniform coating film can be formed.

Therefore, in the manufacturing method, the cell 10 can be manufactured from which a maximum limit potential can be drawn.

Further, in the manufacturing method, due to the pressurization of the wound body external space, which is performed during the pressurization step, the wound body may be impregnated with the electrolytic solution to a degree such that the electrolytic solution impregnated into the wound body is not pushed away by the air in the wound body external space, and it is not always necessary to performed the hermetic closing step after pouring the electrolytic solution.

The results obtained by evaluating the degree of impregnation of the electrolytic solution E when the conditions of the depressurization step are changed will be explained hereinbelow.

As depicted in FIG. 12, in the evaluation of the depressurization conditions, the degree of impregnation of the electrolytic solution E was confirmed by using a transmitting probe 210 and a receiving probe 220 disposed opposite each other at both sides of the outer case 30 in the thickness direction thereof.

As depicted in FIG. 12(*a*), the ultrasound waves falling on the portion of the wound body 100 which is impregnated with the electrolytic solution E and in which no air remains between the laminated surfaces of the positive electrode 101, negative electrode 102, and separators 103 are received by the receiving probe 220.

Meanwhile, as depicted in FIG. 12(*b*), the reflection amount of the ultrasound waves falling on the portion of the wound body 100 which has not been impregnated with the electrolytic solution E, that is, the portion where the air remains between the laminated surfaces, increases and, therefore, such ultrasound waves are not received by the receiving probe 220.

In the evaluation of the depressurization conditions, the outer case 30, transmitting probe 210, and receiving probe 220 were moved relative to each other in the vertical direction and axial direction of the wound body 100 (depthwise direction in FIG. 12), and the entire surface of the wound body 100 was irradiated with the ultrasound waves.

In the evaluation of the depressurization conditions, the degree of impregnation of the electrolytic solution E in the vertical direction and axial direction of the wound body 100 was confirmed by confirming whether or not the ultrasound waves have been received at this time by the receiving probe 220.

As depicted in FIG. 13, in the evaluation of the depressurization conditions, the batteries of the following first comparative example to third comparative example were manufactured.

The cell of the first comparative example was manufactured in the same manner as in the first embodiment, except that the degree of vacuum in the depressurization process was low.

The cell of the second comparative example was manufactured by reversing the order of the depressurization step and pouring step.

In other words, the cell of the second comparative example was manufactured by performing the depressurization step after performing the pouring step under the air atmosphere to depressurize the interior of the outer case 30, and then performing the hermetic closing step, waiting step, pressurization step, and main sealing step such as in the first embodiment.

The degree of vacuum in the depressurization step in the second comparative example is lower than that in the depressurization step of the first embodiment.

The cell of the third comparative example was manufactured in the same manner as in the second comparative example, except that the degree of vacuum in the depressurization step was high.

The waiting time in the waiting step in the first to third comparative examples was the same as the waiting time in the waiting step of the first embodiment.

In the cell of the first comparative example, although the both axial end portions 100*a*, 100*b* of the wound body 100 were impregnated with the electrolytic solution E immediately after the pouring, no significant impregnation with the electrolytic solution E took place in the waiting step.

This is apparently because the degree of vacuum during the depressurization step was too low and the difference in pressure between the wound body external space S and the wound body internal space S1 during the waiting step was lower than in the first embodiment.

Further, in the first comparative example, a large amount of air remained in the axially central portion 100*c* of the wound body 100 even immediately after the pressurization step.

This is apparently because, the degree of vacuum during the depressurization step was too low and a large amount of air remained inside the wound body 100 immediately after the pouring step, which made it impossible to compress the wound body internal space S1 to a narrow region which practically cannot be recognized visually in the pressurization step.

As indicated hereinabove, in the manufacturing method, it is preferred that the degree of vacuum inside the outer case 30 be increased during the depressurization step. As a result, the manufacturing method makes it possible to discharge a large amount of the air located inside the wound body 100, thereby enabling the impregnation with the electrolytic solution in a wider range.

In the second comparative example, only parts of the both axial end portions 100*a*, 100*b* of the wound body 100 were impregnated with the electrolytic solution E after the pressurization step.

Further, in the second comparative example, only parts of the both axial end portions 100*a*, 100*b* of the wound body 100 were impregnated with the electrolytic solution E immediately after the pouring step.

This is apparently because the pouring step was performed before the depressurization step, and therefore a gap was formed between the two side surfaces, in the thickness direction, of the wound body 100 and the two side surfaces, in the width direction, of the housing portion 31, and the ultrasound waves were reflected by the air in the gap.

Therefore, in the second comparative example, the both axial end portions 100*a*, 100*b* of the wound body 100 were apparently impregnated with the electrolytic solution immediately after the pouring step. The same is true with respect to the third comparative example.

When the depressurization step is performed after the pouring step, as in the second comparative example, only the air in the wound body external space S is discharged, and the pressure in the wound body external space S becomes lower than the pressure in the wound body internal space S1 during the waiting step.

Therefore, in the second comparative example, it was apparently impossible to promote the impregnation with the electrolytic solution E by using the difference in pressure between the wound body external space S and the wound body internal space S1.

In the third comparative example, although the portion impregnated with the electrolytic solution E was increased with respect to that in the second comparative example, the electrolytic solution E could not be impregnated as far as the axially central portion 100*c* of the wound body 100 even after the pressurization step.

Further, in the third comparative example, although the lower end portions of the both axial end portions 100a, 100b of the wound body 100 were impregnated with the electrolytic solution E immediately after the pouring step, the air penetrated thereinto after the waiting step and pressurization step.

This was apparently part of the route for the air formed when an attempt was made to draw out the air located in the wound body 100 by depressurization.

In the first embodiment, the both axial end portions 100a, 100b of the wound body 100 were impregnated with the electrolytic solution E immediately after the pouring step, and the axially central portion 100c of the wound body 100 was impregnated with the electrolytic solution E during the waiting step.

In the first embodiment, the entire surface of the wound body 100 was impregnated with the electrolytic solution E after the pressurization step.

The above-described evaluation results indicate that by increasing the pressure in the wound body external space S greater than the pressure in the wound body internal space S1, it is possible to promote the impregnation of the wound body 100 with the electrolytic solution E by making use of the difference in pressure between the wound body external space S and the wound body internal space S1.

In other words, in the manufacturing method, the air in the wound body 100 may be discharged before the both axial end portions 100a, 100b of the wound body 100 are impregnated with the electrolytic solution E.

Therefore, in the manufacturing method, it is not always necessary to perform the pouring step after the depressurization step. For example, the pouring step may be started immediately before the depressurization step is completed.

Further, in the manufacturing method, by confirming the degree of impregnation of the electrolytic solution E on the basis of reflection of ultrasound waves, as in the evaluation of the depressurization conditions, it is also possible to confirm the time until the equilibrium of pressures in the wound body external space S and wound body internal space S1 is reached.

The results obtained in evaluating the degree of impregnation of the electrolytic solution E in the case in which the conditions for impregnating the electrolytic solution E by making use of the difference in pressure between the wound body external space S and wound body internal space S1 were changed are explained hereinbelow.

In the evaluation of the impregnation conditions, the degree of impregnation of the electrolytic solution E was confirmed on the basis of a difference in the reflection amount of ultrasound waves in the same manner as in the evaluation of the depressurization conditions (see FIG. 12).

As depicted in FIG. 14, in the evaluation of the impregnation conditions, cells of fourth comparative example and fifth comparative example were manufactured and the degree of impregnation of the electrolytic solution E was compared with that in the cell 10 of the first embodiment which was confirmed by the evaluation of the depressurization conditions.

The cell of the fourth comparative example was manufactured by performing the depressurization step at a degree of vacuum lower than that in the depressurization step of the first embodiment and then returning the pressure inside the outer case 30 to the atmospheric pressure and performing the main sealing of the pouring hole 33.

In other words, the cell of the fourth comparative example was manufactured by reducing the difference in pressure between the wound body external space S and the wound body internal space S1 during the waiting step with respect to that in the first embodiment and performing no pressurization step.

The cell of the fifth comparative example was manufactured by performing the depressurization step at the degree of vacuum same as in the first embodiment, and then increasing the pressure inside the outer case 30 over the atmospheric pressure and performing the main sealing of the pouring hole 33.

In other words, the cell of the fifth comparative example was manufactured by increasing the difference in pressure between the wound body external space S and wound body internal space S1 during the waiting step with respect to that in the first embodiment and performing no pressurization step.

The results obtained in confirming the degree of impregnation of the electrolytic solution E immediately after the pressurization are depicted in FIG. 14.

In the cell of the fourth comparative example, although the both axial end portions 100a, 100b of the wound body 100 were impregnated with the electrolytic solution E, the impregnation with the electrolytic solution E did not reach the axially central portion 100c of the wound body 100.

This is apparently because the difference in pressure between the wound body external space S and the wound body internal space S1 during the waiting step was too small.

In the cell of the fifth comparative example, although the lower side of the wound body 100 was impregnated with the electrolytic solution E, the upper side of the wound body 100 was not impregnated with the electrolytic solution E.

This is apparently because the pressure in the wound body external space S was too high as compared with the pressure in the wound body internal space S1 (the difference in pressure between the wound body external space S and the wound body internal space S1 was too large), and the air in the wound body external space S penetrated into the wound body internal space S1.

The above-described evaluation results indicate that the difference in pressure between the wound body external space S and the wound body internal space S1 during the waiting step is preferably set to at most about 1 atm.

Further, in the manufacturing method, the impregnation of the wound body 100 with the electrolytic solution E is preferably divided into two steps, namely, the waiting step and pressurization step.

Further, in the manufacturing method, the wound body 100 can be effectively impregnated with the electrolytic solution E, without the penetration of the air of the wound body external space S into the wound body internal space S1.

Further, in the manufacturing method, it is not always necessary to perform the pressurization step only once, and the pressurization step may be performed two or more times.

The manufacturing method of the second embodiment will be explained hereinbelow.

The parts configured in the same manner as in the first embodiment will be assigned with the reference numerals same as those in the first embodiment, and the explanation thereof will be omitted.

Figure 15:
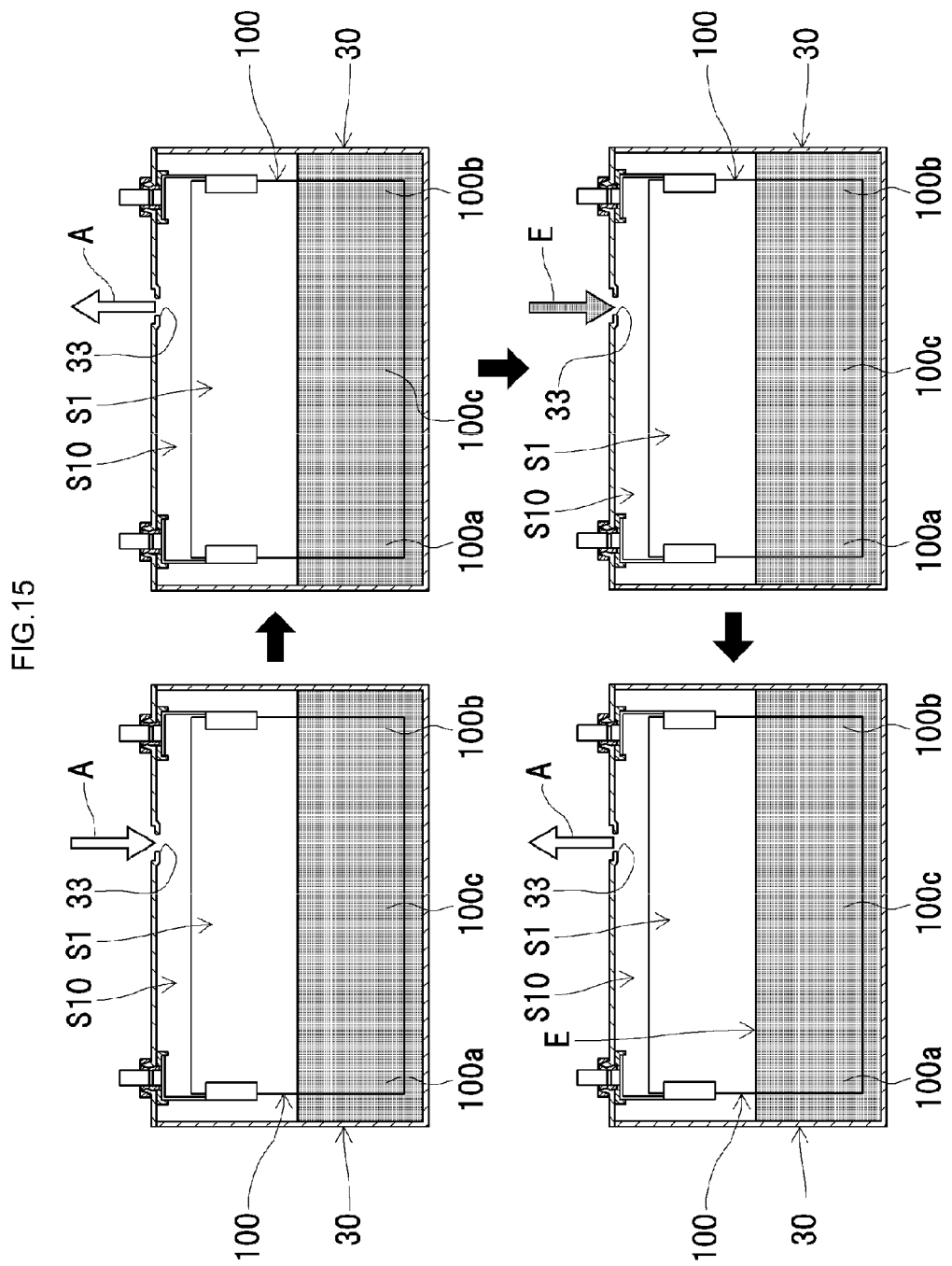
FIG. 15 is an explanatory drawing illustrating how the pressure in the outer case is returned to the atmospheric pressure after expanding the outer case of the second embodiment.

As depicted in FIG. 15, in the manufacturing method of the second embodiment, the wound body 100 is produced to the same specifications as in the manufacturing method of the first embodiment, the wound body 100 is housed in the housing portion 31 of the outer case 30, and the outer case 30 is sealed.

Figure 16A:
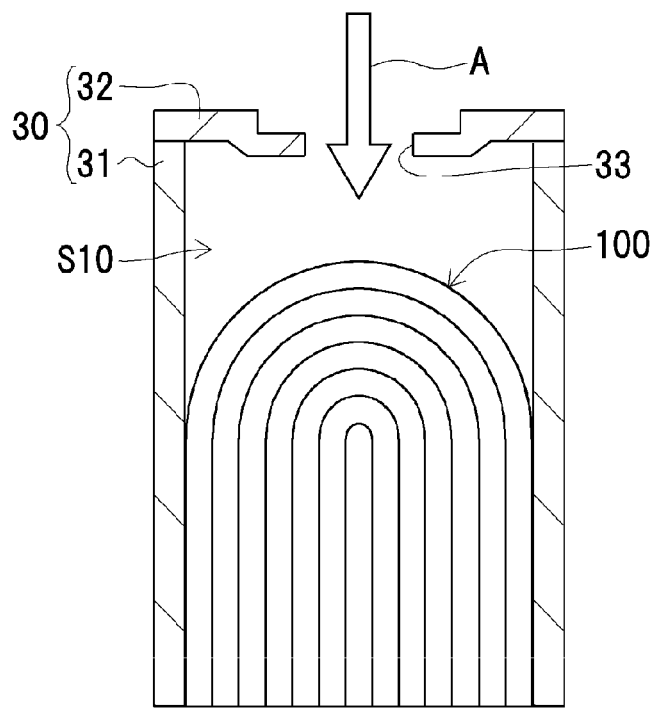
FIGS. 16(a) and 16(b) are explanatory drawings illustrating how the outer case is expanded.
Figure 16B:
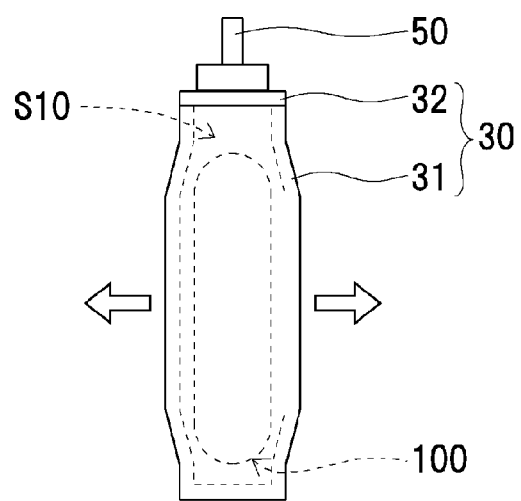

As depicted in FIGS. 15 and 16, after the outer case 30 has been sealed, in the manufacturing method, the interior of the outer case 30 is pressurized and the housing portion 31 of the outer case 30 is expanded outward in the thickness direction (see the downward arrow A depicted in FIG. 15, the arrow depicted in FIG. 16(*b*), and the housing portion 31).

At this time, in the manufacturing method, the pouring hole 33 is sealed with a substantially cylindrical seal member and the compressed air is introduced into the outer case 30 from the seal member.

As a result, in the manufacturing method of the second embodiment, a gap is formed between the two side surfaces in the thickness direction of the wound body 100 and the two side surfaces in the width direction of the housing portion 31, and the volume of the wound body external space S10 is made larger than the volume of the wound body external space S of the first embodiment.

After the outer case 30 has been expanded, in the manufacturing method, the expanded state of the outer case 30 is maintained with a predetermined jig that prevents the outer case 30 from returning to the original shape.

Further, in the manufacturing method, the depressurization step and pouring step are successively performed in the same manner as in the first embodiment, while the outer case 30 is being maintained in the expanded state, and the pressure inside the outer case 30 is then returned to the atmospheric pressure (1 atm in the second embodiment) (see the upward arrow A and arrow E depicted in FIG. 15).

Thus, in the manufacturing method of the second embodiment, a step of expanding the outer case 30 to the outside is performed before the step of depressurizing the interior of the outer case 30.

As depicted in FIG. 17, after the pressure inside the outer case 30 has been returned to the atmospheric pressure, in the manufacturing method, a substantially disk-shaped cap 140 is placed on the pouring hole 33, while the outer case 30 is being maintained in the expanded state, and the outer edge portion of the cap 140 is irradiated with a laser beam with a laser welding machine.

As a result, in the manufacturing method, a hermetic closing step is performed for main-sealing the pouring hole 33 and hermetically closing the outer case 30 into which the electrolytic solution has been poured. In other words, no pre-sealing of the pouring hole 33 is performed in the manufacturing method of the second embodiment.

Further, in the manufacturing method, after the outer case 30 has been hermetically closed, a waiting step is performed for waiting while the outer case 30 is being maintained in the expanded state and reducing the difference in pressure between the wound body external space S and the wound body internal space S1 (see the electrolytic solution E represented by a two-dot broken line in FIG. 17).

In other words, in the manufacturing method of the second embodiment, the waiting step is performed in a state in which the volume of the wound body external space S10 is larger than the volume of the wound body external space S of the first embodiment.

As a result, in the manufacturing method of the second embodiment, the degree of enlargement of the volume of the wound body external space S10 can be further reduced even when the electrolytic solution E has been impregnated and the height position of the level of the electrolytic solution E has been decreased.

In other words, in the manufacturing method, the decrease in pressure of the wound body external space S10 in the course of impregnation with the electrolytic solution E can be suppressed.

Figure 18:
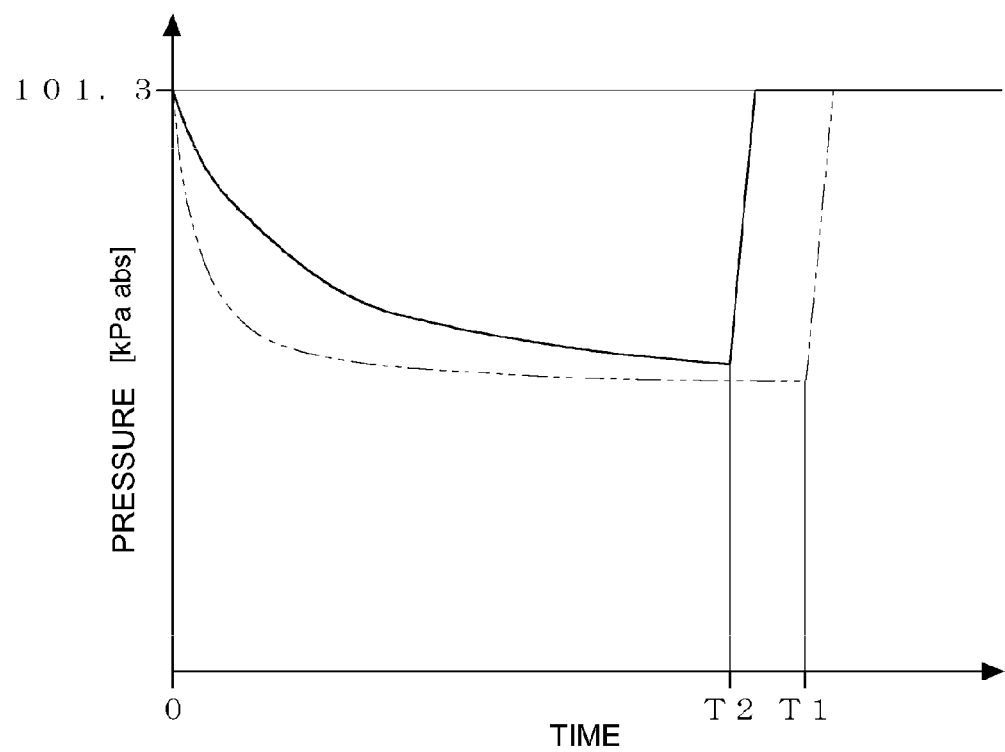
FIG. 18 depicts changes in pressure in the wound body external space during the waiting step and pressurization step of the first embodiment and second embodiment.

Therefore, as depicted in FIG. 18, in the manufacturing method of the second embodiment, a state with a large difference in pressure between the wound body external space S10 and the wound body internal space S1 can be maintained despite the impregnation with the electrolytic solution E. Therefore, the impregnation with the electrolytic solution E during the waiting step can be further promoted.

When the volume of the wound body external space S10 is made larger than the volume of the wound body external space S of the first embodiment, as in the manufacturing method of the second embodiment, the time until the equilibrium of pressures in the wound body external space S10 and the wound body internal space S1 is reached is extended with respect to that in the first embodiment.

Accordingly, in the manufacturing method of the second embodiment, it is possible to wait until the wound body 100 is impregnated with the electrolytic solution E to the same degree as in the waiting process of the first embodiment (see time T2 indicated in FIG. 18). In other words, in the manufacturing method of the second embodiment, it is possible not to wait until the equilibrium of pressures in the wound body external space S10 and the wound body internal space S1 is reached.

As a result, in the manufacturing method of the second embodiment, the duration of the waiting step can be shortened with respect to that of the waiting step of the first embodiment.

As depicted in FIG. 17, after the waiting step has been performed, in the manufacturing method, the expansion state of the outer case 30 is canceled and the initial charging step is performed.

Figure 19:
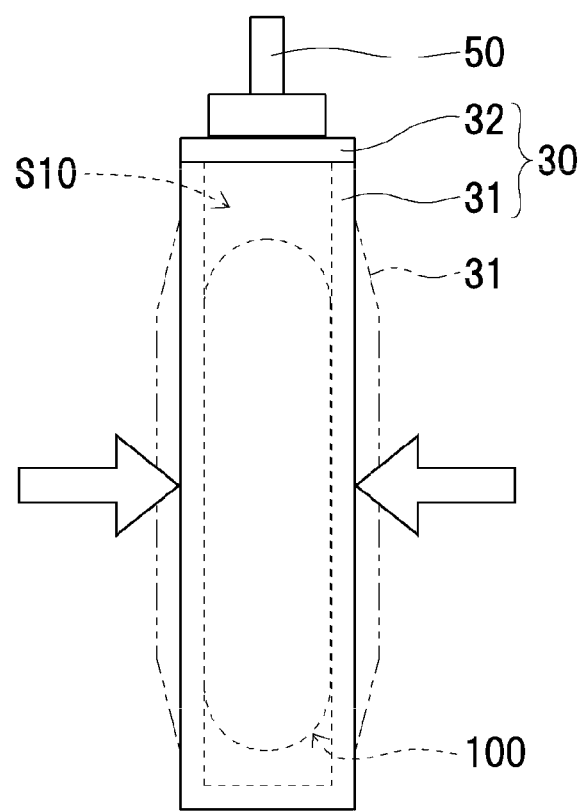
FIG. 19 is an explanatory drawing illustrating how the outer case is pressurized during the initial charging step.
Figure 20:
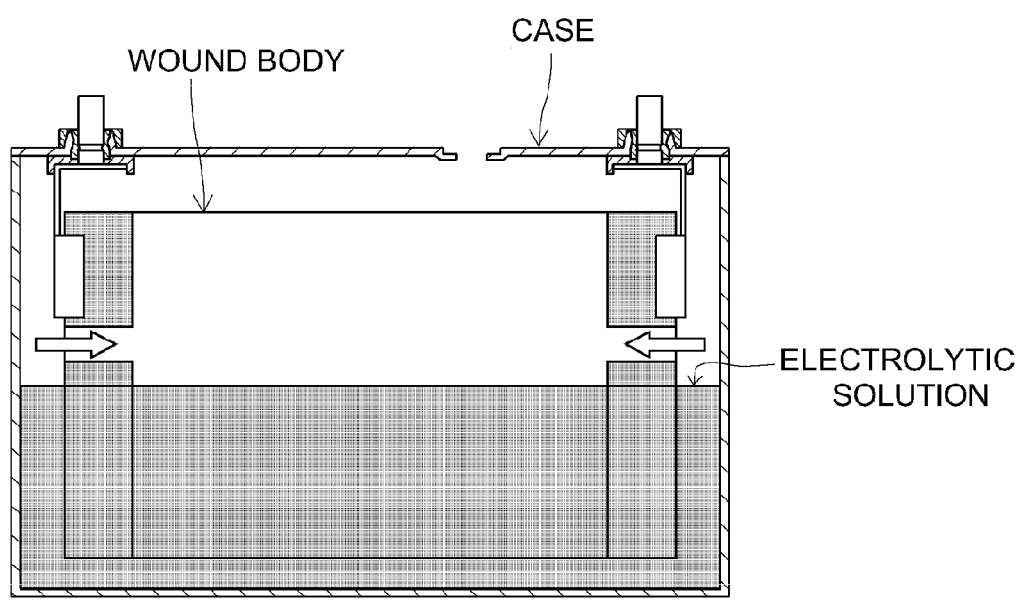
FIG. 20 is an explanatory drawing illustrating the degree of impregnation of the electrolytic solution in the related art.

In other words, as depicted in FIG. 19, in the manufacturing method, the jig for maintaining the expanded state of the outer case 30 is removed, the outer case 30 is then restrained with a restraining jig, and a load of a predetermined value is applied to the outer case 30 along the thickness direction of the outer case 30 (see the arrow indicated in FIG. 19).

As a result, as depicted in FIG. 18 and FIG. 19, in the manufacturing method, after the electrolytic solution E has been impregnated, the outer case 30 is pressurized from the outside and the outer case 30 is compressed to return the volume of the wound body external space S10 to the original value.

In the manufacturing method of the second embodiment, the pressurization step is thus performed to reduce the volume of the wound body external space S10 and pressurize the wound body external space S10 relative to the wound body internal space S1.

As a result, in the manufacturing method of the second embodiment, a state in which the pressure of the wound body external space S10 is higher than that of the wound body internal space S1 can be obtained before the cell 10 is initially charged.

Therefore, in the manufacturing method of the second embodiment, the wound body 100 can be effectively impregnated with the electrolytic solution E by making use of the difference in pressure between the wound body external space S10 and the wound body internal space S1 before the cell 10 is initially charged.

After the initial charging step has been performed, in the manufacturing method, the cell 10 is manufactured by performing voltage inspection and releasing the restraint of the outer case 30 with the restraining jig.

In the manufacturing method of the second embodiment, the outer case 30 is expanded such that the pressure in the wound body external space S10 becomes equal to or higher than the atmospheric pressure when the outer case 30 is compressed.

In other words, in the manufacturing method, the pressure in the wound body external space S10 immediately before the outer case 30 is compressed is measured with a commercial pressure sensor before the cell 10 is actually manufactured, and the degree of expansion of the outer case 30 is set on the basis of the measurement result.

For example, when the pressure in the wound body external space S10 immediately before the outer case 30 is compressed is half of the atmospheric pressure, in the manufacturing method, the outer case 30 is expanded until the volume of the wound body external space S10 is increased by a factor of 2 or more.

Thus, in the pressurization step, the outer case 30 is compressed and the wound body external space S10 is pressurized to a pressure equal to or higher than the atmospheric pressure.

As a result, in the manufacturing method, the difference in pressure between the wound body external space S10 and the wound body internal space S1 can be further increased during the pressurization step. Therefore, the wound body can be more effectively impregnated with the electrolytic solution E.

Thus, with the manufacturing method, the entire surface of the wound body 100 can be reliably impregnated with the electrolytic solution E.

Further, in the manufacturing method, it is not always necessary to compress the outer case expanded to the outside during the pressurization step.

In this case, in the manufacturing method, for example, it is possible to compress intentionally the two, left and right, end portions of the outer case, for example, by applying locally a load higher than the restraining load during the initial charging to both, left and right, end portions of the outer case, strictly speaking, to the two, left and right, sides of the wound body, thereby reducing the volume of the wound body external space.

However, in the manufacturing method, it is preferred that the outer case 30 which has been expanded to the outside be pressurized in the pressurization step and the outer case 30 be compressed in the direction opposite to the expansion direction, as in the second embodiment.

As a result, in the manufacturing method, the volume of the wound body external space S10 in the waiting step can be further increased, and therefore the impregnation with the electrolytic solution E can be further promoted during the waiting step.

Further, in the manufacturing method, since the compression ratio of the outer case 30 during the pressurization step can be further increased, the difference in pressure between the wound body external space S and the wound body internal space S1 in the pressurization step can be further increased. In other words, with the manufacturing method, the entire surface of the wound body 100 can be reliably impregnated with the electrolytic solution E during the pressurization step.

In the waiting step of the second embodiment, it is also possible to wait until the equilibrium of pressures in the wound body external space and the wound body internal space is reached.

As a result, with the manufacturing method, the wound body can be impregnated with a larger amount of the electrolytic solution during the waiting step. Therefore, the entire surface of the wound body can be more reliably impregnated with the electrolytic solution during the pressurization step.

Yet another (third) embodiment of the method for manufacturing a secondary cell in accordance with the present invention will be explained hereinbelow.

In a lithium ion secondary cell, the cell internal pressure rises due to gas generation during the use. Therefore, it is desirable that the cell internal pressure during the cell manufacture be suppressed such as to obtain the allowed cell internal pressure even when the gas is generated.

Where the gas generated during the initial charging remains inside the electrode body, the cell internal pressure increases. Therefore, a technique is known by which the cell is depressurized after the initial charging, the gas is removed, and the cell is then sealed.

In the conventional method for manufacturing a secondary cell, the operation of sealing the cell is performed while depressurizing the cell interior by using a depressurization chamber.

As a result, the internal pressure of the sealed cell can be reduced.

However, in the conventional method, a large-scale apparatus such as a depressurization chamber is required to reduce the internal pressure of the sealed cell.

Therefore, a technique needs to be developed that can reduce the internal pressure of the sealed cell by using an apparatus of a simple configuration, that is, without using a large-scale apparatus such as a depressurizing chamber.

Figure 21A:
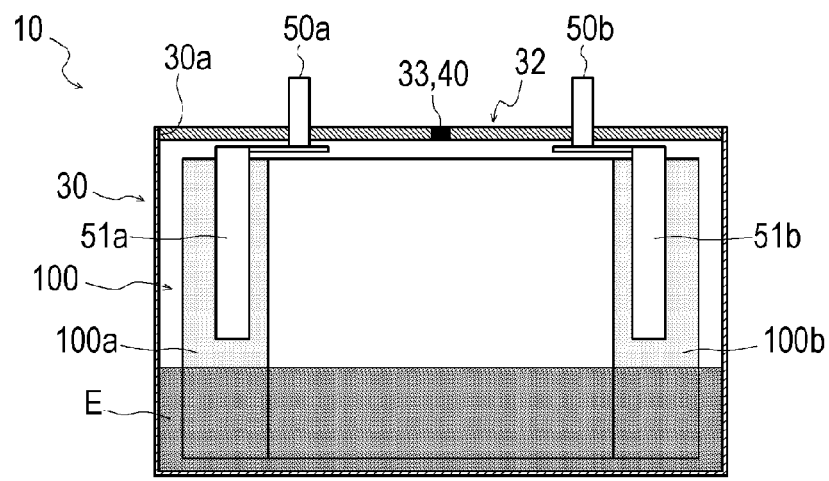
FIGS. 21(a), 21(b), and 21(c) are schematic diagrams illustrating the entire configuration of the secondary cell which is the application object of the method for manufacturing a secondary cell according to the third embodiment of the present invention.

Explained hereinbelow is the cell 10 obtained by using the manufacturing method according to the third embodiment of the present invention. As depicted in FIG. 21(a), the cell 10 includes the wound body 100, the outer case 30 for housing the wound body 100, and the lid 32 that seals the opening 30a of the outer case 30, and the electrolytic solution E is poured into the outer case 30.

The pouring hole 33 for pouring the electrolytic solution E is formed in the lid 32, and a hermetically closed space is formed by sealing the pouring hole 33 with the cap 40.

Figure 21B:
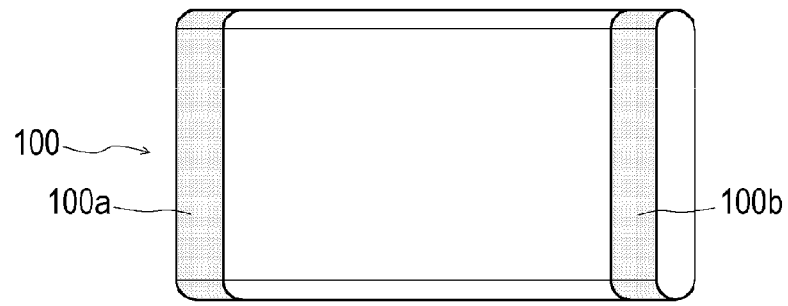
Figure 22:
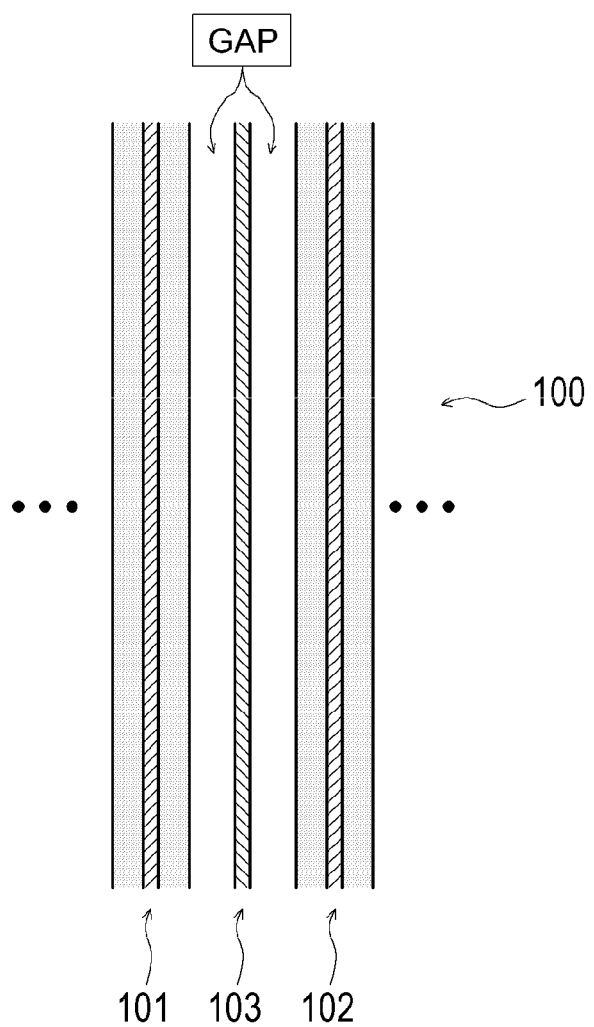
FIG. 22 is a partial schematic drawing illustrating the structure of the end portion of the secondary cell.

As depicted in FIG. 21(b), the wound body 100 constituting the cell 10 is of a wound configuration which is formed by laminating a positive electrode 101 and a negative electrode 102 which are shaped as sheets, such as depicted in FIG. 22, with separators 103 interposed therebetween, winding the laminate into a wound body and then flattening the wound body in the direction perpendicular to the winding axis.

An one axial end portion 100a of the wound body 100 on the positive electrode side in the winding axis direction is configured as a positive electrode uncoated portion, and the other axial end portion 100b on the negative electrode side is configured as a negative electrode uncoated portion.

Further, as depicted in FIG. 21(a), a current-collecting terminal 51 (collector 51a) connected to an external terminal 50 (positive electrode terminal 50a) is welded to the one axial end portion 100a on the positive electrode side, and a current-collecting terminal 51 (collector 51b) connected to an external terminal 50 (negative electrode terminal 50b) is welded to the other axial end portion 100b on the negative electrode side.

The configuration depicted in FIG. 21(a) in which terminals 6, 8 are protruded upward corresponds to the posture in the usually usage state of the cell 10. The up-down direction in FIG. 21(a) is the height direction of the cell 10, the left-right direction is the width direction of the cell 10, and the direction perpendicular to the paper sheet is the thickness direction of the cell 10.

Figure 21C:
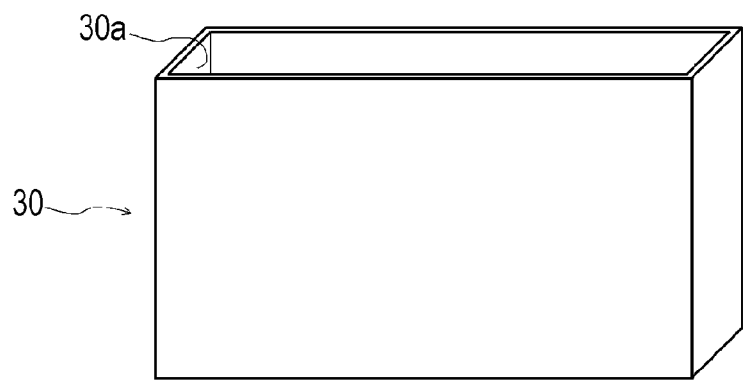

As depicted in FIG. 21(c), the outer case 30 constituting the cell 10 has a box-like shape, and the opening 30a is formed in the upper side thereof.

Further, as depicted in FIG. 21(a), the housing of the cell 10 is formed by welding the lid 32 to the opening 30a.

In the present embodiment, an example of the box-like cell 10 including the wound body 100 is explained, but the type of the secondary cell obtained by using the manufacturing method according to the third embodiment of the present invention is not limited to such a configuration. For example, a secondary cell having a laminated electrode body or a secondary cell having a cylindrical shape may be considered.

The method for manufacturing the cell 10 according to the third embodiment of the present invention will be explained hereinbelow with reference to FIG. 23 to FIG. 25.

(Evacuation Step)

Figure 23:
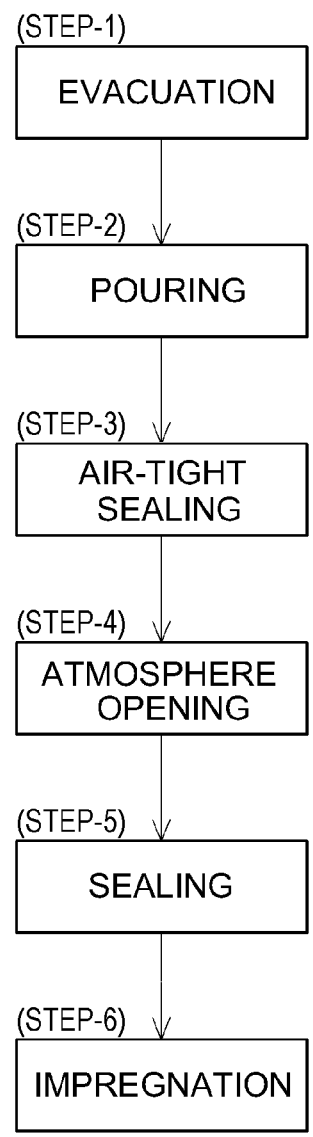
FIG. 23 is a flow diagram illustrating the method for manufacturing a secondary cell according to the third embodiment of the present invention.
Figure 24:
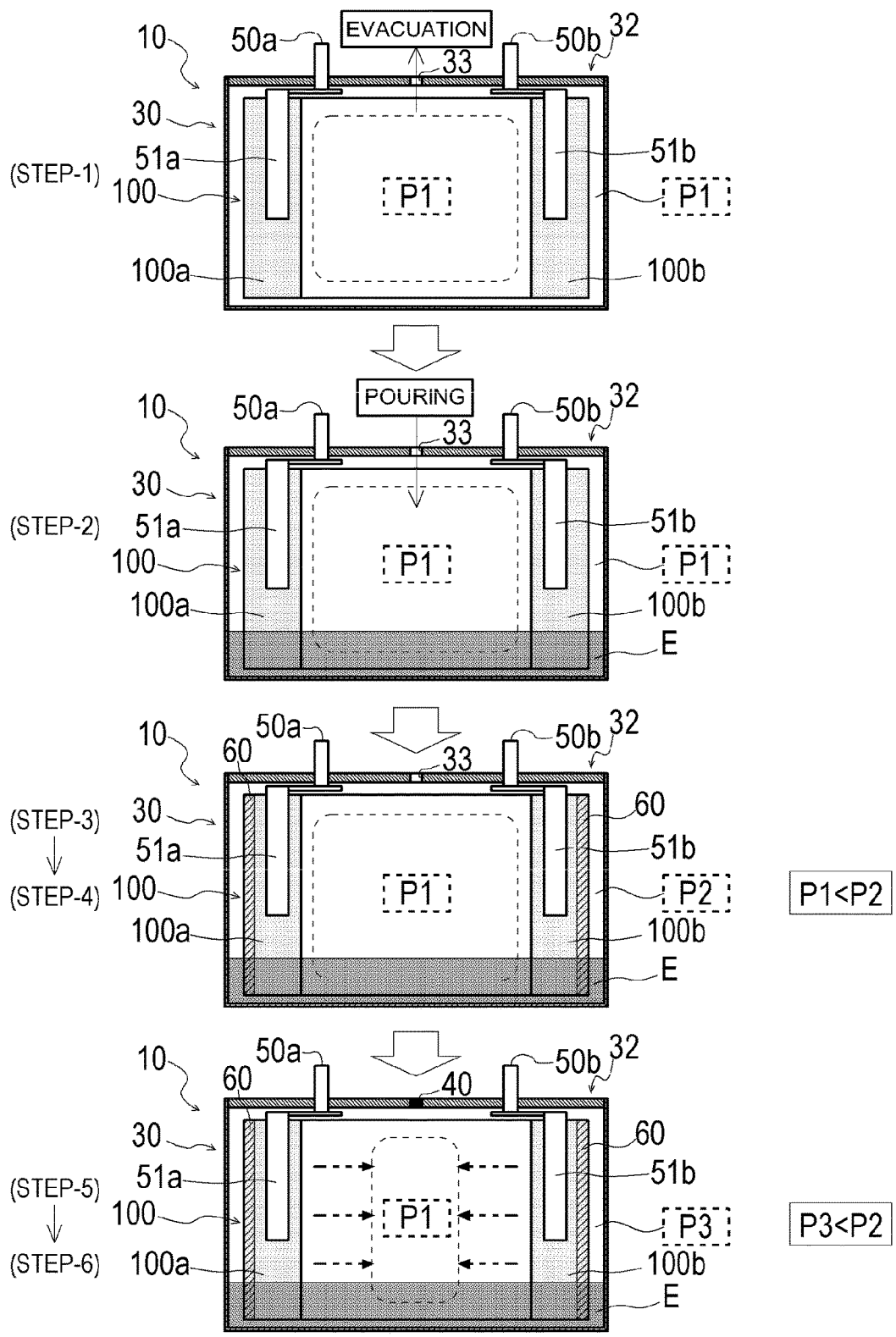
FIG. 24 is a schematic diagram illustrating the state of the secondary cell in each step of the method for manufacturing a secondary cell according to the third embodiment of the present invention.

In the method for manufacturing the cell 10 according to the third embodiment of the present invention, initially, as depicted in FIG. 23 and FIG. 24, the wound body 100 is housed in the outer case 30, the opening 30a of the outer case 30 is sealed with the lid 32, and the interior of the outer case 30 is then evacuated from the pouring hole 33 of the lid 32 (STEP-1).

In the evacuation step (STEP-1), a negative pressure is created inside the outer case 30, the gas remaining inside the wound body 100 is sucked out, and a negative pressure is created inside the wound body 100.

Further, the pressure reached inside the outer case 30 in the evacuation step (STEP-1) is specified as a pressure P1, and the pressure inside the wound body 100 also becomes the pressure P1.

The "negative pressure", as referred to herein, means a pressure lower than the atmospheric pressure. The "atmosphere", as referred to herein, is an atmosphere outside the outer case 30, and the "atmospheric pressure" is the pressure of the air outside the outer case 30.

(Pouring Step)

In the method for manufacturing the cell 10 according to the third embodiment of the present invention, the electrolytic solution E is then poured into the outer case 30 (STEP-2).

The pouring step (STEP-2) is performed in a state in which the pressure P1 (negative pressure) is maintained inside the outer case 30.

A method performed while depressurizing the interior of a container (pot) for pouring the electrolytic solution E or a method for creating a negative pressure inside the outer case 30 and then supplying the electrolytic solution E from a pipe system having a check valve can be used for pouring while maintaining the interior of the outer case 30 under a negative pressure.

(Air-tight Sealing Step)

In the method for manufacturing the cell 10 according to the third embodiment of the present invention, a seal portion 60 (a hatched portion shown at one axial end portion 100a, 100b in FIG. 24), which is a part for ensuring air tightness between interior and exterior of the wound body 100, is formed in the wound body 100 (STEP-3).

In the air-tight sealing step (STEP-3), the seal portion 60 is formed by impregnating the wound body 100 from the one axial end portion 100a, 100b with the electrolytic solution E. The interior and exterior of the wound body 100 are separated by the seal portion 60 which is the portion of the one axial end portion 100a, 100b impregnated with the electrolytic solution E. Further, after the seal portion 60 has been formed, the pressure inside the wound body 100 on the inner side of the seal portion 60 is maintained at the pressure P1.

As depicted in FIG. 22, the wound body 100 is configured by laminating the positive electrode 101, the negative electrode 102, and the separator 23. Active materials covering the surfaces of the positive electrode 101 and the negative electrode 102 are porous and air tightness of the positive electrode 101 and the negative electrode 102 is ensured by the penetration of the electrolytic solution E into the pores. The electrolytic solution E also flows into the gaps between the members 101, 102, and 103 and the gaps are sealed, thereby forming the seal portion 60.

Figure 25:
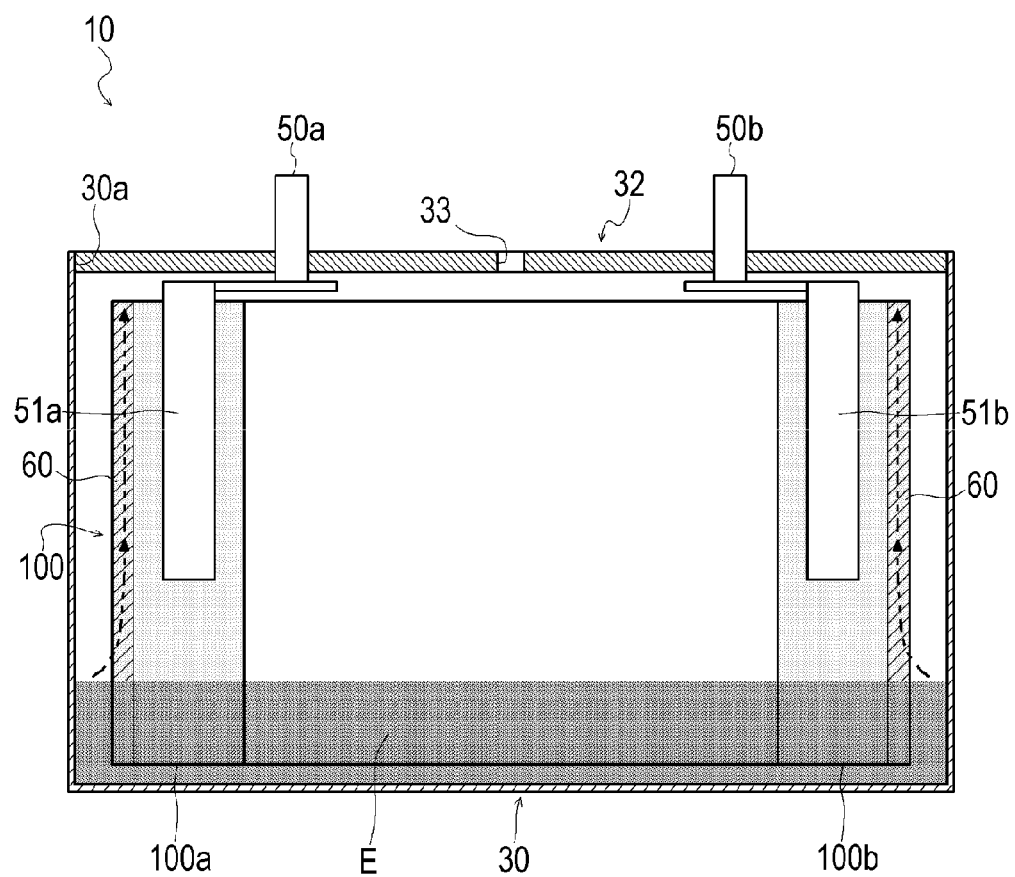
FIG. 25 is a schematic diagram illustrating how a seal portion is formed.

Further, where the lower portion of the wound body 100 is infiltrated with the electrolytic solution E, as depicted in FIG. 25, the electrolytic solution E also permeates to a position higher than the level of the electrolytic solution E due to a capillary effect, and the seal portions 60 are formed when a state is reached in which the end surfaces of the two axial end portions 100a, 100b are entirely impregnated with the electrolytic solution E.

When the seal portion 60 is formed by the capillary effect, the seal portion 60 is formed while the gaps through which a fluid can flow between the interior and exterior of the wound body 100 are gradually reduced. For example, the seal portion 60 may be formed over a shorter period of time when the electrolytic solution E is actively brought into contact with the one axial end portion 100a, 100b of the wound body 100 by rotating or vibrating the outer case 30 in which the wound body 100 and the electrolytic solution E are housed.

Whether or not the seal portion 60 has been formed is determined not only based on whether or not the impregnation with the electrolytic solution E proceeded through the entire end surface of the one axial end portion 100a, 100b, but also by considering the ventilation resistance (pressure loss) in the one axial end portion 100a, 100b.

When the ventilation resistance (pressure loss) in the one axial end portion 100a, 100b of the wound body 100 is sufficiently large, the air or the like does not flow and sealing ability is ensured even when the impregnation of the one axial end portion 100a, 100b with the electrolytic solution E is incomplete (a gap remains). Therefore, in such a case, it may be determined that the seal portion 60 has been formed.

(Atmosphere Opening Step)

In the method for manufacturing the cell 10 according to the third embodiment of the present invention, the interior of the outer case 30 is then restored to the atmospheric pressure P2, as depicted in FIG. 23 and FIG. 24 (STEP-4).

The atmosphere opening step (STEP-4) is naturally performed by removing the pot for pouring the electrolytic solution E from the pouring hole 33, under the atmospheric pressure.

In the atmosphere opening step (STEP-4), the pressure inside the outer case 30 on the outside of the wound body 100 becomes the atmospheric pressure P2. Meanwhile, the pressure inside the wound body 100 is maintained at P1.

When the ventilation resistance (pressure loss) in the one axial end portion 100a, 100b of the wound body 100 is sufficiently large, the pressure P1 inside the wound body 100 does not rise even when the inside of the outer case 30 is open to the atmosphere in a state in which the impregnation of the one axial end portion 100a, 100b with the electrolytic solution E is incomplete (a gap remains).

Therefore, in such a case, it may be assumed that the seal portion 60 has been formed despite the incomplete impregnation of the one axial end portion 100a, 100b with the electrolytic solution E, and a transition may be made from the air-tight sealing step (STEP-3) to the atmosphere opening step (STEP-4).

Further, it is preferred that the atmosphere opening step (STEP-4) be completed and a transition to the next step be made in a short time as possible.

(Sealing Step)

In the method for manufacturing the cell 10 according to the third embodiment of the present invention, the pouring hole 33 in the lid 32 is then sealed (STEP-5).

In the method for manufacturing the cell 10 according to the third embodiment of the present invention, the sealing step (STEP-5) can be performed under the atmospheric pressure.

Immediately after the pouring hole 33 has been sealed in the sealing step (STEP-5), the pressure inside the outer case 30 on the outside of the wound body 100 is substantially equal to the atmospheric pressure P2, and the pressure inside the wound body 100 is maintained at a level substantially equal to the pressure P1.

The sealing step (STEP-5) is preferably completed in a state in which the impregnation of the wound body 100 with the electrolytic solution E after the pouring is as small as possible.

Therefore, it is preferable to use an electrode body configured such that it is determined that the seal portion 60 has been formed even when the impregnation of the one axial end portion 100a, 100b with the electrolytic solution E is incomplete, and to complete the steps from the air-tight sealing step (STEP-3) to the sealing step (STEP-5) as fast as possible after the pouring step.

(Impregnation Step)

In the method for manufacturing the cell 10 according to the third embodiment of the present invention, the interior of the wound body 100 is then further impregnated with the electrolytic solution E (STEP-6).

In the impregnation step (STEP-6), the impregnation with the electrolytic solution E proceeds from the two axial end portions 100a, 100b in the winding axis direction of the wound body 100 towards the center, and the interior of the wound body 100 is impregnated with the electrolytic solution E.

The sealing ability of the seal portion 60 is such that the pressure P1 inside the wound body 100 can be maintained over a short period of time (for example, about several hours) and also such that a fluid can move inside and outside the wound body 100 over a long period of time (for example, several days).

Therefore, when the impregnation of the wound body 100 with the electrolytic solution E advances and the impregnated amount increases, as depicted in FIG. 24, the pressure P2 inside the outer case 30 on the outside of the wound body 100 and the pressure P1 inside the wound body 100 change such that the equilibrium is reached, and the pressure P2 inside the outer case 30 on the outside of the wound body 100 decreases and becomes a pressure P3.

The range in which the pressure P1 inside the wound body 100 is maintained is reduced as the impregnation of the wound body 100 with the electrolytic solution E advances.

In the method for manufacturing the cell 10 according to the third embodiment of the present invention, the pressure inside the outer case 30 can thus be made the pressure P3, which is lower than the atmospheric pressure P2, without using a large-scale apparatus such as a vacuum chamber, and the equipment for manufacturing the cell 10 is simplified.

Further, in the method for manufacturing the cell 10 according to the third embodiment of the present invention, the steps after the atmosphere opening step (STEP-4) can be performed under the atmospheric pressure. Therefore, the production efficiency of the cell 10 is also improved.

Thus, the method for manufacturing the cell 10 according to the third embodiment of the present invention includes the evacuation step (STEP-1) of evacuating the interior of the outer case 30 in a state in which the wound body 100 is housed in the outer case 30, the pouring step (STEP-2) of pouring the electrolytic solution E into the outer case 30, and the sealing step (STEP-5) of sealing the outer case 30, wherein the evacuation step (STEP-1) includes the air-tight sealing step (STEP-3) of producing a negative pressure inside the wound body 100 and air-tightly sealing the interior of the wound body 100 with respect to the exterior of the wound body 100 in a state with a negative pressure inside the wound body 100, and the atmosphere opening step (STEP-4) of opening the inside of the outer case 30 to the atmosphere in a state in which the interior of the wound body 100 is air-tightly sealed with respect to the exterior of the wound body 100, the sealing step (STEP-5) is performed in a state in which the interior of the wound body 100 is air-tightly sealed with respect to the exterior of the wound body 100 and the inside of the outer case 30 is open to the atmosphere.

Further, in the method for manufacturing the cell 10 according to the third embodiment of the present invention, the air-tight sealing step (STEP-3) is performed by impregnating the one axial end portion 100a, 100b of the wound body 100 with the electrolytic solution E, and also the air-tight sealing step (STEP-3) is performed by impregnating the one axial end portion 100a, 100b of the wound body 100 with the electrolytic solution E by a capillary effect.

With such a configuration, the pressure inside the cell can be reduced by using an apparatus of a simple structure.

By suppressing the pressure inside the cell to low pressure at all times, it is possible to increase the tolerance with respect to the gas generated by reduction and decomposition of the electrolytic solution E and eventually suppress the occurrence of metal fatigue caused by the increase in internal pressure (that is, the malfunction of a safety valve or a current cut-off device), and increase the reliability of the cell 10.

Methods for promoting the impregnation of the wound body 100 with the electrolytic solution E will be explained hereinbelow with reference to FIG. 26 to FIG. 28.

With the first method for promoting the impregnation of the wound body 100 with the electrolytic solution E in the method for manufacturing the cell 10 according to the third embodiment of the present invention, the cell 10 is inverted in the vertical direction to induce the impregnation with the electrolytic solution E.

Figure 26:
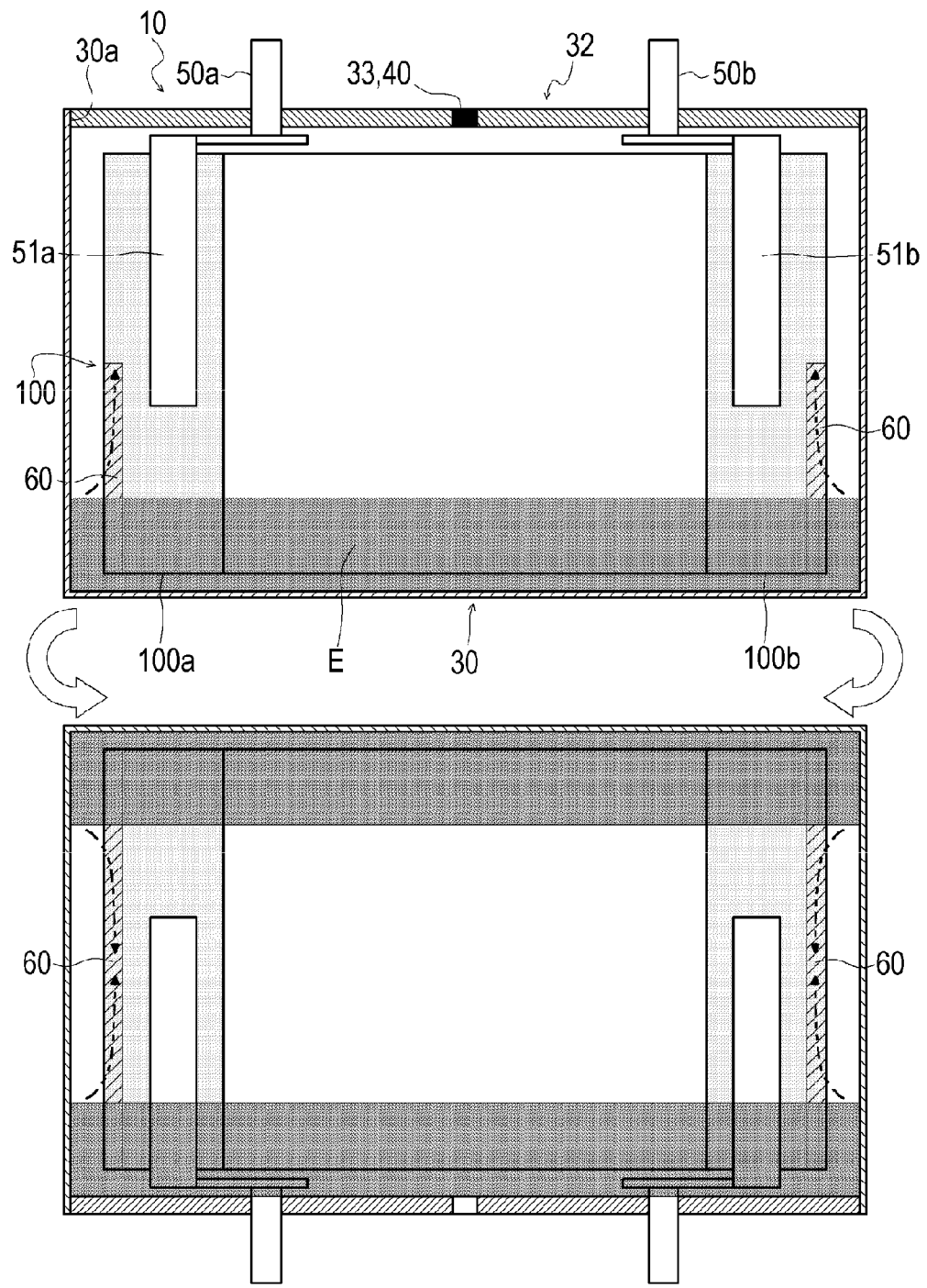
FIG. 26 is a schematic diagram illustrating the first method for promoting the impregnation of the electrode body with the electrolytic solution.

As depicted in FIG. 26, with the first method, the cell 10 is inverted with respect to the axis parallel to the width direction of the cell 10 so as to be vertically symmetrical.

With the first method, initially, the lower portion of the wound body 100 is impregnated with the electrolytic solution E, and then by inverting the cell 10 in the vertical direction, the impregnation with the electrolytic solution E is induced from a region corresponding to the upper portion of the wound body 100.

With such a configuration, it is possible to increase the amount of the electrolytic solution E impregnated into the wound body 100.

With the second method for promoting the impregnation of the wound body 100 with the electrolytic solution E in the method for manufacturing the cell 10 according to the third embodiment of the present invention, the cell 10 is inverted in the horizontal direction to induce the impregnation with the electrolytic solution E.

Figure 27:
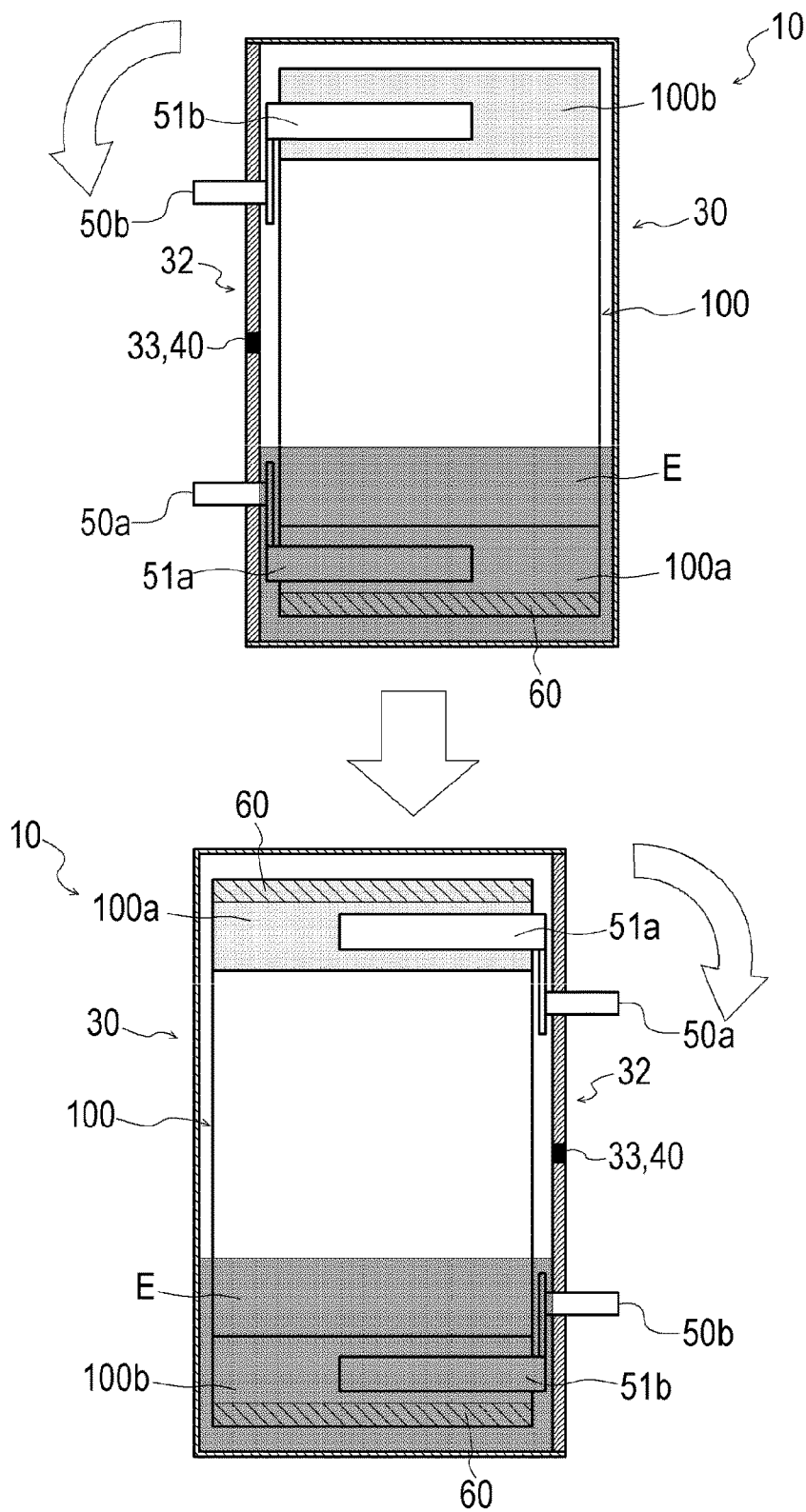
FIG. 27 is a schematic diagram illustrating the second method for promoting the impregnation of the electrode body with the electrolytic solution.

As depicted in FIG. 27, with the second method, the cell 10 is inverted horizontally with respect to the axis parallel to the thickness direction of the cell 10.

With the second method, initially, the wound body 100 is rotated to the left or to the right through 90 degrees, and in this state, the impregnation with the electrolytic solution E proceeds from the one axial end portion 100a on one side of the wound body 100. Then, the cell 10 is rotated through 180 degrees to induce the impregnation with the electrolytic solution E from the other axial end portion 100b on the other side of the wound body 100. The rotation angle of the wound body 100 in the second method may be changed as appropriate.

With such a configuration, it is possible to increase the amount of the electrolytic solution E impregnated into the wound body 100.

With the third method for promoting the impregnation of the wound body 100 with the electrolytic solution E in the method for manufacturing the cell 10 according to the third embodiment of the present invention, the impregnation is induced by rotating the cell 10 to raise gradually the electrolytic solution E inside the outer case 30.

Figure 28:
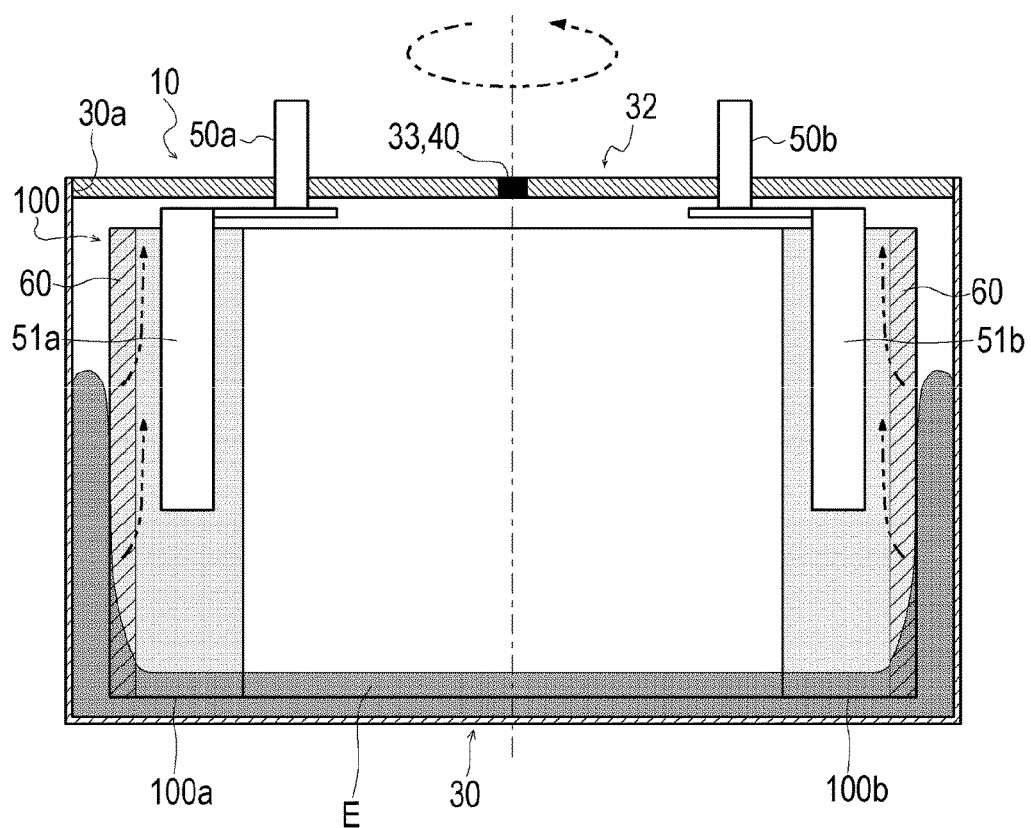
FIG. 28 is a schematic diagram illustrating the third method for promoting the impregnation of the electrode body with the electrolytic solution.

As depicted in FIG. 28, with the third method, the cell 10 is rotated about the axis parallel to the height direction of the cell 10, this axis passing through the center of the cell 10 in the planar view thereof.

In the third method, the electrolytic solution E is raised upward along the left and right wall surfaces inside the outer case 30 by the centrifugal force created by the rotation of the cell 10.

Further, with the third method, the raised electrolytic solution E is brought into contact with the left and right axial end portions 100a, 100b of the wound body 100, thereby inducing the impregnation with the electrolytic solution E from a wider range in the axial end portions 100a, 100b of the wound body 100 and increasing the amount of the electrolytic solution E impregnated into the wound body 100.

The effect obtained with the method for manufacturing the secondary cell according to the third embodiment of the present invention will be described hereinbelow with reference to FIG. 29.

Figure 29:
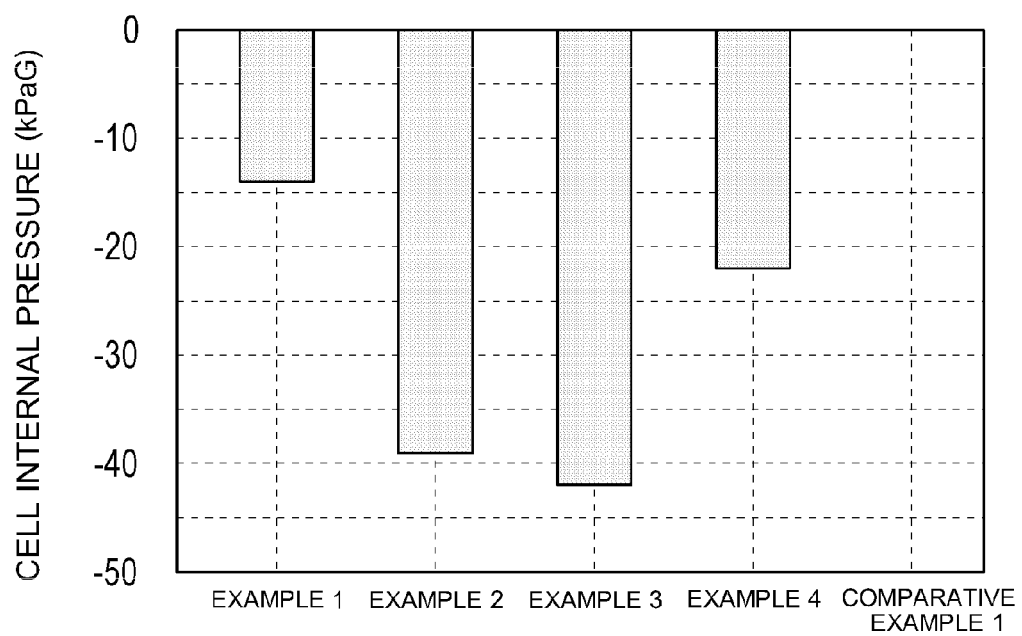
FIG. 29 illustrates the results obtained in confirming the application results of the method for manufacturing a secondary cell according to the third embodiment of the present invention.

FIG. 29 depicts the results obtained by measuring the cell internal pressure 2 days after the impregnation step (STEP-6) has been started with respect to the secondary cell obtained by using the method for manufacturing the secondary cell according to the third embodiment of the present invention.

Different manufacturing methods were used in Examples 1 to 4 and Comparative Example 1 depicted in FIG. 29.

In Comparative Example 1, the conventional method for manufacturing a secondary cell was employed, the interior of the outer case 30 was opened before the pouring, the pouring was performed in a state in which the pressure inside the wound body 100 was the atmospheric pressure, and the pouring hole 33 was then sealed.

Example 1 corresponds to the aspect illustrated by FIG. 25. Thus, in the air-tight sealing step (STEP-3), the seal portion 60 was formed by impregnating the one axial end portion 100a, 100b of the wound body 100 with the electrolytic solution E by using the capillary effect. In Example 1, the amount of the poured electrolytic solution E is increased by 50% with respect to those of other examples 2 to 4 and Comparative Example 1.

Example 2 corresponds to the aspect illustrated by FIG. 26. Thus, in the air-tight sealing step (STEP-3), the seal portion 60 was formed by impregnating the one axial end portion 100a, 100b of the wound body 100 with the electrolytic solution E by using the capillary effect, and in the impregnation step (STEP-6), the cell 10 was inverted in the vertical direction to promote the impregnation of the wound body 100 with the electrolytic solution E.

Example 3 corresponds to the aspect illustrated by FIG. 27. Thus, in the air-tight sealing step (STEP-3), the seal portion 60 was formed by impregnating the one axial end portion 100a, 100b of the wound body 100 with the electrolytic solution E by using the capillary effect, and in the impregnation step (STEP-6), the cell 10 was rotated in the horizontal direction to promote the impregnation of the wound body 100 with the electrolytic solution E.

Example 4 corresponds to the aspect illustrated by FIG. 28. Thus, in the air-tight sealing step (STEP-3), the seal portion 60 was formed by impregnating the one axial end portion 100a, 100b of the wound body 100 with the electrolytic solution E by using the capillary effect, and in the impregnation step (STEP-6), the cell 10 was rotated and the electrolytic solution E was raised inside the outer case 30, thereby promoting the impregnation of the wound body 100 with the electrolytic solution E.

According to the results depicted in FIG. 29, the method for manufacturing a secondary cell according to Example 3 was determined to be the most effective in terms of reducing the cell internal pressure, and the effectiveness decreased in the order of Example 2, Example 4, and Example 1. In Comparative Example 1, the cell internal pressure was not reduced.

Thus, the results depicted in FIG. 29 have confirmed that the method for manufacturing the cell 10 according to the third embodiment of the present invention can reduce the cell internal pressure.

Further, when the method for manufacturing the cell 10 according to the third embodiment of the present invention was employed, it was determined that the cell internal pressure can be further reduced by further promoting the impregnation of the wound body 100 with the electrolytic solution E after sealing the outer case 30.

The invention claimed is:

1. A method for manufacturing a secondary cell, comprising:
    a step of depressurizing an interior of a cell case having a pouring hole;
    a step of pouring an electrolytic solution into the depressurized cell case;
    a step of impregnating a wound body with the electrolytic solution from both axial end portions of the wound body;
    a step of returning a wound body external space, which is a space between the cell case and the wound body, to atmospheric pressure;
    a step of pre-sealing the cell case after the wound body external space is returned to atmospheric pressure;
    a step of increasing the impregnated amount of the electrolytic solution in the both axial end portions of the wound body in order to reduce a difference in pressure between the wound body external space and a wound body internal space, which is an internal space of the wound body, after the pre-sealing the cell case, and air-tightly sealing the wound body internal space with respect to the wound body external space with the impregnated electrolytic solution;

a step of canceling the pre-sealing of the cell case and returning the wound body external space to atmospheric pressure to pressurize the wound body external space, which has been reduced in the difference in pressure; and a step of sealing the pouring hole of the cell case after the pre-sealing of the cell is cancelled and the wound body external space is returned to atmospheric pressure.

2. The method for manufacturing a secondary cell according to claim 1, comprising waiting until an equilibrium of pressures in the wound body external space and the wound body internal space is reached in the air-tight sealing step.

3. The method for manufacturing a secondary cell according to claim 1, wherein in order to return the wound body external space to atmospheric pressure, the cell case is opened to the atmosphere.

* * * * *